ated under 35
(12) United States Patent
Yamamoto

(10) Patent No.: US 8,066,338 B2
(45) Date of Patent: Nov. 29, 2011

(54) VEHICLE BRAKE CONTROLLER AND VEHICLE BRAKE CONTROL METHOD

(75) Inventor: Kentaro Yamamoto, Kariya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 715 days.

(21) Appl. No.: 12/168,542

(22) Filed: Jul. 7, 2008

(65) Prior Publication Data

US 2009/0015059 A1  Jan. 15, 2009

(30) Foreign Application Priority Data

Jul. 11, 2007 (JP) .................................. 2007-182184

(51) Int. Cl.
*B60T 13/20* (2006.01)

(52) U.S. Cl. .......... 303/11; 303/115.4; 303/150; 701/80

(58) Field of Classification Search .................... 303/10, 303/11, 12, 20, 150, 157, 113.1, 115.4, 155.5; 701/73, 78, 80, 83
See application file for complete search history.

(56) References Cited

U.S. PATENT DOCUMENTS

| 4,428,624 | A | * | 1/1984 | Farr | 303/10 |
| 5,487,593 | A | * | 1/1996 | Potts et al. | 303/11 |
| 5,558,414 | A | * | 9/1996 | Kubota | 303/10 |
| 6,339,738 | B1 | | 1/2002 | Kohl et al. | |
| 7,165,818 | B2 | * | 1/2007 | Iwasaki et al. | 303/115.5 |
| 2005/0002135 | A1 | | 1/2005 | Kokubo | |

FOREIGN PATENT DOCUMENTS

| JP | 2001-505505 A | 4/2001 |
| JP | 2004-352163 A | 12/2004 |
| WO | WO 98/06611 | 2/1998 |

* cited by examiner

*Primary Examiner* — Thomas J Williams
(74) *Attorney, Agent, or Firm* — Buchanan Ingersoll & Rooney PC

(57) ABSTRACT

Each time a prescribed cycle comes to an end, an ECU estimates an average retaining amount of brake fluid in a reservoir of the current prescribed cycle on the assumption that a pump has sucked a constant amount of brake fluid in the current prescribed cycle. The ECU calculates deviation between the average retaining amount at the end of the previous prescribed cycle and the average retaining amount at the end of the current prescribed cycle. The greater the deviation is, the greater a deviation correction amount the ECU sets. The ECU performs deviation pump control in which the target suction amount of the pump is set based on the reference suction amount and the deviation correction amount.

16 Claims, 9 Drawing Sheets

VEHICLE BRAKE CONTROLLER AND VEHICLE BRAKE CONTROL METHOD

BACKGROUND OF THE INVENTION

The present invention relates to a vehicle brake controller that controls a brake pump of a vehicle. The present invention further relates to a vehicle brake control method.

Some types of vehicle brake apparatuses generate brake fluid pressure in each of wheel cylinders provided in wheels so that braking force is applied to each wheel. Specifically, a brake apparatus that performs anti-lock brake control (ABS control) ensures steerability of a vehicle by suppressing locking of the wheels when the vehicle is braked quickly. In the ABS control, the brake controller controls the brake apparatus in such a manner that a fluctuation cycle of brake fluid pressure of each wheel cylinder is repeated. The fluctuation cycle of the fluid pressure includes decreasing, keeping, and increasing of the brake fluid pressure.

A brake controller described in Japanese National Phase Laid-Open Patent Publication No. 2001-505505 introduces excessive brake fluid that has been sent from a wheel cylinder to a reservoir when the brake fluid pressure in the wheel cylinder is to be decreased. The brake controller then sucks the brake fluid from the reservoir to the exterior by means of a pump. The brake controller estimates the increase amount of the brake fluid in the reservoir from when the brake fluid pressure in the wheel cylinder starts to decrease to when the brake fluid pressure starts to be maintained at a constant level. The brake controller adjusts the rotational speed of a motor, which is the drive source of the pump, in such a manner as to suck the brake fluid from the reservoir by the amount corresponding to the increase amount before the subsequent cycle is started. This prevents the reservoir from becoming full with the excessive brake fluid during the ABS control.

However, the duration of the fluctuation cycle of the fluid pressure varies from one cycle to another. In other words, the rotational speed of the motor is changed at different timings from one fluctuation cycle of the brake fluid to another. Thus, in the ABS control, the rotational speed of the motor changes non-periodically, leading to non-periodic change in at least one of the noise caused by the pump and the noise brought about by the motor. This may cause discomfort for occupants of the vehicle.

Generally, as the $\mu$ value, or the friction coefficient, of a road surface on which the vehicle travels becomes greater, the amount of excessive brake fluid in the ABS control becomes greater. Thus, a brake controller described in Japanese Laid-Open Patent Publication No. 2004-352163 sets the rotational speed of the motor in correspondence with the $\mu$ value so that the rotational speed of the motor is changed less frequently during the ABS control. However, if, for example, the $\mu$ value changes, the amount of the brake fluid sent from the reservoir may become insufficient.

SUMMARY OF THE INVENTION

Accordingly, it is an objective of the present invention to provide a brake controller of a vehicle that suppresses noise uncomfortable for the occupants of the vehicle. The present invention further provides a vehicle brake control method.

According to one aspect of the invention, a vehicle brake controller that controls a vehicle brake apparatus is provided. The vehicle brake apparatus brakes a wheel that moves on a road surface. The vehicle brake apparatus includes a line for brake fluid and a wheel cylinder arranged in the line in correspondence with the wheel. The wheel cylinder applies a braking force to the wheel in correspondence with a brake fluid pressure produced based on braking operation by the driver. A reservoir is provided in the line. The reservoir retains the brake fluid flowing out from the wheel cylinder. A direction heading from the wheel cylinder to the reservoir is referred to as a flow direction of the brake fluid. A pump sucks the brake fluid retained in the reservoir. The pump discharges the sucked brake fluid to a portion of the line that is upstream from the wheel cylinder with respect to the flow direction. An on-off valve is arranged in the line at a position between the wheel cylinder and the reservoir. The brake controller controls the pump and the on-off valve in such a manner as to repeat a cycle of increase and decrease of a retaining amount of the brake fluid in the reservoir. The brake controller includes a reference suction amount setting section that sets a reference suction amount of the pump. The greater the $\mu$ value of the road surface is, the greater the reference suction amount the reference suction amount setting section sets. An average retaining amount estimating section estimates an average retaining amount, which is a time average of the retaining amount. Each time a prescribed cycle ends, the average retaining amount estimating section estimates the average retaining amount in the current prescribed cycle on the assumption that the pump has sucked a constant amount of brake fluid in the current prescribed cycle. A deviation correction amount setting section sets a deviation correction amount in accordance with which a deviation of the average retaining amount is corrected. The deviation correction amount setting section calculates the deviation between the average retaining amount at the end of the previous prescribed cycle and the average retaining amount at the end of the current prescribed cycle. The greater the deviation is, the greater the deviation correction amount the deviation correction amount setting section sets. A control section performs a deviation pump control on the pump. While performing the deviation pump control, the control section sets a target suction amount of the pump based on the reference suction amount and the deviation correction amount, and controls the pump in such a manner that the pump sucks the brake fluid by the amount corresponding to the target suction amount.

According to another aspect of the invention, a brake controller including a reference suction amount setting section and a control section that determines whether the $\mu$ value has become smaller is provided. When determining that the $\mu$ value has become smaller, the control section performs an emergency pump control on the pump. The control section sets an emergency correction amount, in accordance with which the suction amount of the pump is corrected. While performing the emergency pump control, the control section sets a target suction amount of the pump based on the reference suction amount and the emergency correction amount. The control section controls the pump in such a manner that the pump sucks the brake fluid by the amount corresponding to the target suction amount.

According to another aspect of the invention, a vehicle brake control method that controls a vehicle brake apparatus is provided. The control method controls the pump and the on-off valve in such a manner as to repeat a cycle of increase and decrease of a retaining amount of the brake fluid in the reservoir. The control method includes setting a reference suction amount of the pump. The greater the $\mu$ value of the road surface is, the greater the reference suction amount is set. The control method further includes estimating an average retaining amount, which is a time average of the retaining amount. Each time a prescribed cycle ends, the average retaining amount in the current prescribed cycle is estimated on the assumption that the pump has sucked a constant amount of brake fluid in the current prescribed cycle. The control method further includes setting a deviation correction amount in accordance with which a deviation of the average retaining amount is corrected. The deviation between the average retaining amount at the end of the previous prescribed cycle and the average retaining amount at the end of the current prescribed cycle is calculated. The greater the deviation is, the greater the deviation correction amount is set. The control method further includes performing a deviation pump control on the pump. The deviation pump control includes setting a target suction amount of the pump based on the reference suction amount and the deviation correction amount. The deviation pump control further includes controlling the pump in such a manner that the pump sucks the brake fluid by the amount corresponding to the target suction amount.

According to another aspect of the invention, a vehicle control method including determining whether the μ value has become smaller and performing an emergency pump control on the pump when determining that the μ value has become smaller is provided. The emergency pump control includes setting an emergency correction amount, in accordance with which the suction amount of the pump is corrected. The emergency pump control further includes setting a target suction amount of the pump based on the reference suction amount and the emergency correction amount. The emergency pump control further includes controlling the pump in such a manner that the pump sucks the brake fluid by the amount corresponding to the target suction amount.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

FIGS. 1 to 12 illustrate one embodiment of the present invention. In the following description, the traveling direction of the vehicle is defined as the forward direction of the vehicle. The leftward and rightward directions are defined with respect to the traveling direction of the vehicle.

Figure 1:
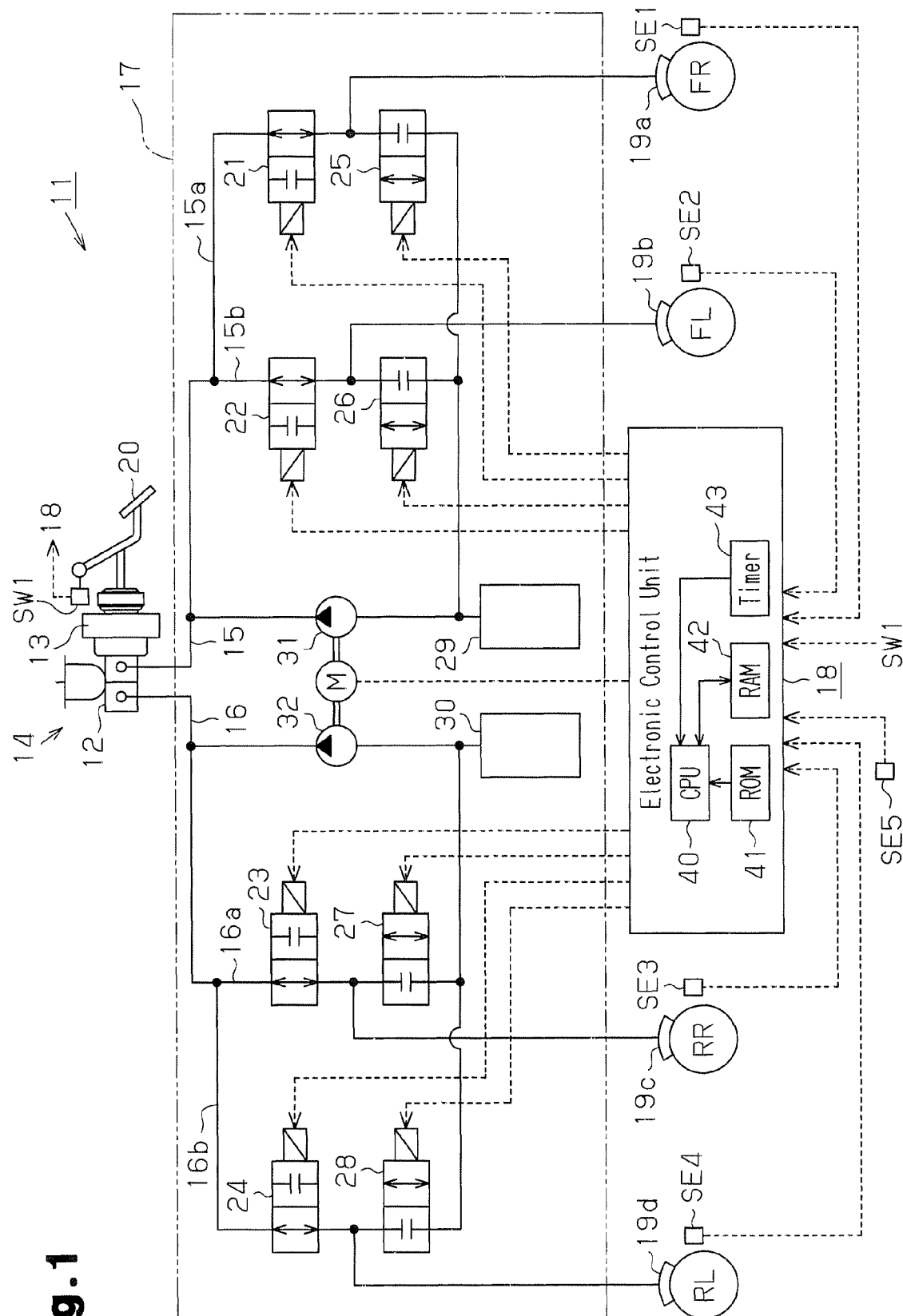
FIG. 1 is a block diagram representing a vehicle brake apparatus, which is controlled by a vehicle brake controller according to one embodiment of the present invention.

As illustrated in FIG. 1, the vehicle has a right front wheel FR, a left front wheel FL, a right rear wheel RR, a left rear wheel RL, and a vehicle brake apparatus 11. The vehicle brake apparatus 11 has a fluid pressure generating device 14, a fluid pressure control device 17, and an ECU 18. The fluid pressure generating device 14 has a master cylinder 12 and a booster 13. The fluid pressure control device 17 has hydraulic circuits 15, 16 and a motor M. The electronic control unit, or the ECU 18, functions as a brake controller that controls the vehicle brake apparatus 11 by controlling the fluid pressure control device 17.

The hydraulic circuits 15, 16 are connected to the fluid pressure generating device 14. The hydraulic circuit 15 is connected to a wheel cylinder 19a operating to brake the wheel FR and a wheel cylinder 19b operating to brake the wheel FL. The hydraulic circuit 16 is connected to a wheel cylinder 19c operating to brake the wheel RR and a wheel cylinder 19d operating to brake the wheel RL.

A brake pedal 20 is provided in the fluid pressure generating device 14. When the driver of the vehicle brakes the vehicle using the brake pedal 20, the ECU 18 controls the master cylinder 12 and the booster 13. Brake fluid in the master cylinder 12 is supplied to the wheel cylinders 19a to 19d through the corresponding hydraulic circuits 15, 16.

The hydraulic circuit 15 has a line 15a connected to the wheel cylinder 19a and a line 15b connected to the wheel cylinder 19b. The hydraulic circuit 16 includes a line 16a connected to the wheel cylinder 19c and a line 16b connected to the wheel cylinder 19d.

First on-off valves 21, 22, 23, and 24, which are normally open, are arranged in the lines 15a, 15b, 16a, and 16b, respectively, at upstream positions from the corresponding wheel cylinders 19a to 19d in the flow direction of the brake fluid. Second on-off valves 25, 26, 27, and 28, which are normally closed, are arranged in the lines 15a, 15b, 16a, and 16b, respectively, at downstream positions from the corresponding wheel cylinders 19a to 19d. Each of the first on-off valves 21 to 24 is, for example, an electromagnetic valve and held in a closed state as long as a solenoid associated with the on-off valve 21 to 24 is excited. Each of the second on-off valves 25 to 28 is, for example, an electromagnetic valve and held in an open state as long as a solenoid associated with the on-off valve 25 to 28 is excited.

A reservoir 29 and a pump 31 are provided in the hydraulic circuit 15. The reservoir 29 temporarily retains the brake fluid that has been sent from the wheel cylinders 19a, 19b. The direction heading from the wheel cylinders 19a, 19b to the reservoir 29 is referred to as the flow direction of the brake fluid in the hydraulic circuit 15. The pump 31 sucks the brake fluid from the reservoir 29 and discharges the brake fluid to the master cylinder 12.

A reservoir 30 and a pump 32 are arranged in the hydraulic circuit 16. The reservoir 30 temporarily retains the brake fluid that has been sent from the wheel cylinders 19c, 19d. The direction heading from the wheel cylinders 19c, 19d to the reservoir 30 is referred to as the flow direction of the brake fluid in the hydraulic circuit 16. The pump 32 sucks the brake fluid from the reservoir 30 and discharges the brake fluid to the master cylinder 12. In other words, after having sucked the brake fluid from the corresponding reservoirs 29, 30, the pumps 31, 32 send the brake fluid to a position upstream from the wheel cylinders 19a to 19d in the flow direction of the brake fluid. The pumps 31, 32 are each driven through rotation of a motor M.

The ECU 18 has an input interface (not shown), an output interface (not shown), a digital computer, and driver circuits (not shown) that drive corresponding devices. The digital computer has a CPU 40, a ROM 41, a RAM 42, and a timer 43.

A brake switch SW1, wheel speed sensors SE1, SE2, SE3, SE4, and a vehicle acceleration SE5 are electrically connected to the input interface. The brake switch SW1 generates a signal corresponding to the operating state of the brake pedal 20. Each of the wheel speed sensors SE1 to SE4 detects the wheel speed of the corresponding one of the wheels FR to RL. The vehicle acceleration sensor SE5 detects deceleration of the vehicle. Deceleration and acceleration of the vehicle are represented with mutually opposite signs, which are a positive sign and a negative sign.

The motor M and the on-off valves 21 to 28 are connected to the output interface. The ECU 18 controls the motor M and each of the on-off valves 21 to 28 individually, in correspondence with signals input by the brake switch SW1 and the sensors SE1 to SE5.

The ROM 41 stores control programs, in accordance with which the motor M and each on-off valve 21 to 28 are controlled, corresponding maps, and threshold values. Specifically, the ROM 41 stores a prescribed cycle A, a deviation correction period KT2, a μ threshold value KSTskid, an emergency correction period KT3, and a post-processing threshold value KTend. The RON 41 also stores the graph of FIG. 2.

The RAM 42 stores information that is rewritten as needed when the vehicle is operated. That is, the RAM 42 stores a wheel speed Vi of each wheel, an estimated vehicle speed Vref, a vehicle deceleration DVref, a reference suction amount Qreq_base, an estimated retaining amount ST, an average retaining amount STave(n), a number of times of deviation obtaining n, an estimated increase amount STskid, a temporary deviation correction amount STave_temp, a deviation correction amount Qreq_Ave, an emergency correction amount Qreq_Skid, a target suction amount Qreq, a first elapsed time T1, a deviation elapsed time T2, an emergency elapsed time T3, a post-processing time Tend, an ABS control flag FLGabs, a deviation correction flag FLGave, an emergency correction flag FLGskid, and a deviation correction amount calculation flag FLGPave.

Figure 3:
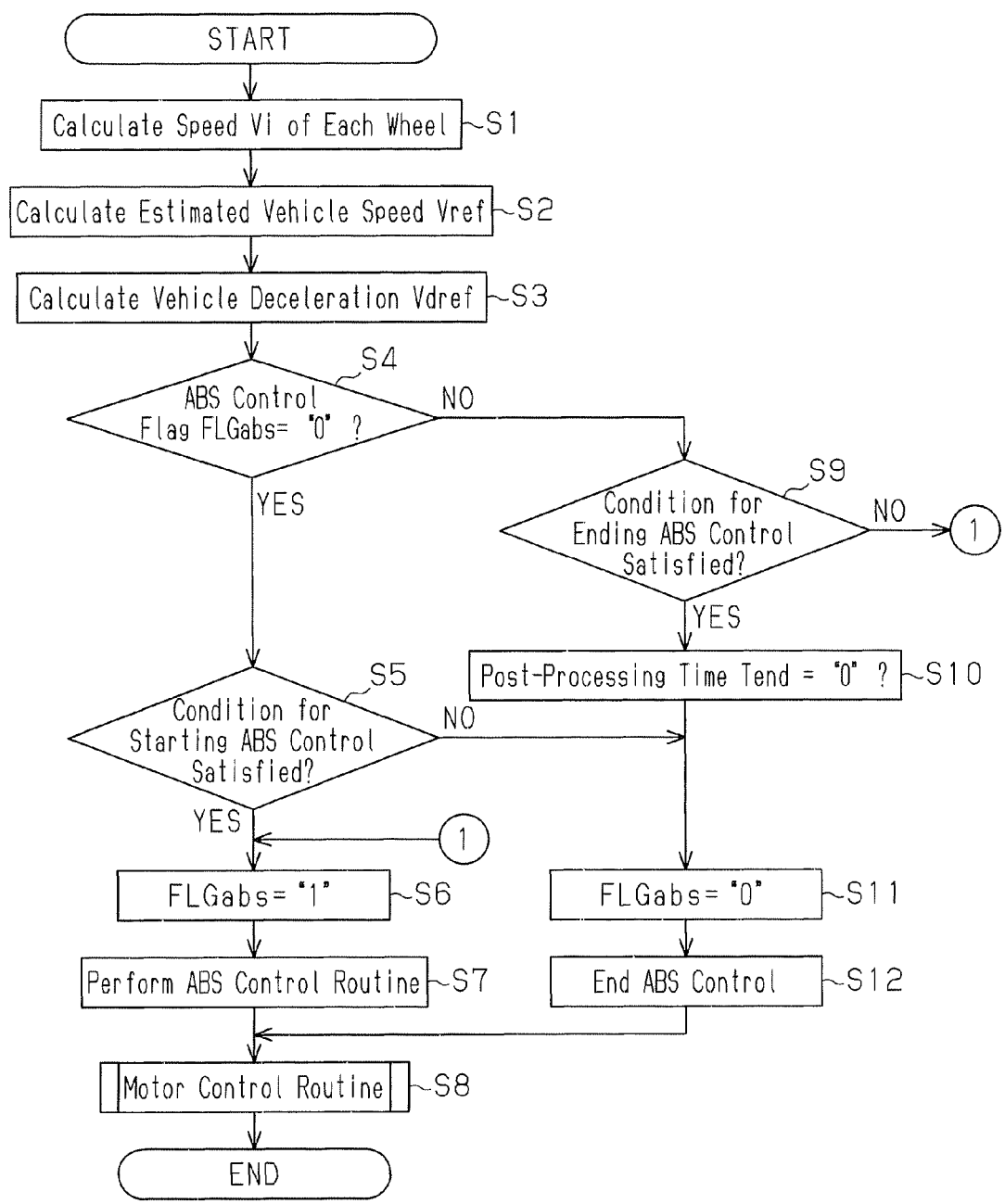
FIG. 3 is a flowchart representing an ABS control routine performed by the ECU shown in FIG. 1.

FIG. 3 is a flowchart representing steps S1 to S8 of an ABS control routine (an anti-lock brake control routine). The ECU 18 performs the ABS control routine at a predetermined cycle t, which is, for example, every 0.01 second.

The ABS control is performed in response to quick braking of the vehicle by the driver when the vehicle is traveling. Specifically, in the ABS control, the ECU 18 operates the on-off valves 21 to 28 and the pumps 31, 32 in such a manner as to repeat a fluid pressure fluctuation cycle of the brake fluid pressure in each of the wheel cylinders 19a to 19d. The fluid pressure fluctuation cycle includes pressure decrease control, pressure keeping control, and pressure increase control.

While performing the ABS control, the ECU 18 repeats the cycle including the pressure increase control, the pressure keeping control, and the pressure decrease control, which will be described in the following.

"Pressure Increase Control"

The ECU 18 holds the first on-off valves 21 to 24 in open states and the second on-off valves 25 to 28 in closed states. This discharges the brake fluid from the master cylinder 12 to the wheel cylinders 19a to 19d through the lines 15a to 16b. As a result, the brake fluid pressure in each wheel cylinder 19a to 19d rises.

"Pressure Keeping Control"

The ECU 18 holds the first on-off valves 21 to 24 and the second on-off valves 25 to 28 all in closed states This restricts flow of the brake fluid in the lines 15a to 16b. As a result, the level of the brake fluid pressure in each wheel cylinder 19a to 19d is maintained constant.

"Pressure Decrease Control"

The ECU 18 holds the first on-off valves 21 to 24 in closed states and the second on-off valves 25 to 28 in open states. This discharges the brake fluid from the wheel cylinders 19a to 19d to positions downstream from the wheel cylinders 19a to 19d, or into the reservoirs 29 and 30, through the lines 15a to 16b. As a result, the brake fluid pressure in each wheel cylinder 19a to 19d drops.

For convenience of explanation, the ABS control routine will be explained based on the following assumptions:
the ABS control are started on the respective wheels FR, FL, RR, and RL at the same time;
the first on-off valves 21 to 24 are selectively opened and closed all at the same time; and
the second on-off valves 25 to 28 are selectively opened and closed all at the same time.

With reference to FIG. 3, in step S1, the ECU 18 calculates the wheel speed Vi of each of the wheels FR, FL, RR, RL based on an input signal of the corresponding one of the wheel speed sensors SE1 to SE4.

In step S2, the ECU 18 obtains the estimated vehicle speed Vref based on the wheel speeds Vi of the wheels FR, FL, RR, RL.

In step S3, the ECU 18 calculates the vehicle deceleration DVref based on an input signal of the vehicle acceleration sensor SE5. In other words, the ECU 18 functions as a vehicle deceleration calculating section.

In step S4, the ECU 18 determines whether the ABS control flag FLGabs is "0" (zero). The ABS control flag FLGabs is set to "1" during the ABS control and "0" when the ABS control is not performed. If determination of step S4 is positive, that is, if the ABS control is not being performed, the ECU 18 determines whether a condition for starting the ABS control is met in step S5. If a positive determination is made in step S5, that is, if the condition for starting the ABS control is satisfied, the ECU 18 performs step S6.

In the illustrated embodiment, the condition for starting the ABS control is that the following "starting condition 1", "starting condition 2", and "starting condition 3" are all satisfied.

The "starting condition 1" is that the brake switch SW1 is held in an ON state.

The "starting condition 2" is that the absolute value of the vehicle deceleration DVref is greater than or equal to a predetermined deceleration threshold value.

The "starting condition 3" is that the slip ratio of at least one of the wheels Fr, FL, RR, RL is greater than or equal to a predetermined slip ratio threshold value.

In step S6, the ECU 18 sets the ABS control flag FLGabs to "1".

In step S7, the ECU 18 controls the on-off valves 21 to 28 to perform the ABS control. The ECU 18 then performs step S8.

In step S8, the ECU 18 performs a motor control routine. In the motor control routine, the ECU 18 controls the motor M, which is the drive source of the pumps 31, 32. The ECU 18 then suspends the ABS control routine.

If the determination is negative in step S4, that is, if the ABS control is being performed, the ECU 18 determines whether a condition for ending the ABS control is satisfied in step S9. The condition for ending the ABS control is met if, for example, the brake switch SW1 is turned off. If the condition for ending the ABS control is not satisfied, the ECU 18 performs step S6.

If a positive determination is made in step S9, that is, if the condition for ending the ABS control is satisfied, the ECU 18 resets the post-processing time Tend to "0" in step S10 and then performs step S11. The ECU 18 performs step S11 also when a negative determination is made in step S5. The post-processing time Tend represents the time elapsed since the end of the ABS control.

In step S11, the ECU 18 sets the ABS control flag FLGabs to "0". The ECU 18 ends the ABS control in step S12 and then performs step S8.

Figure 4:
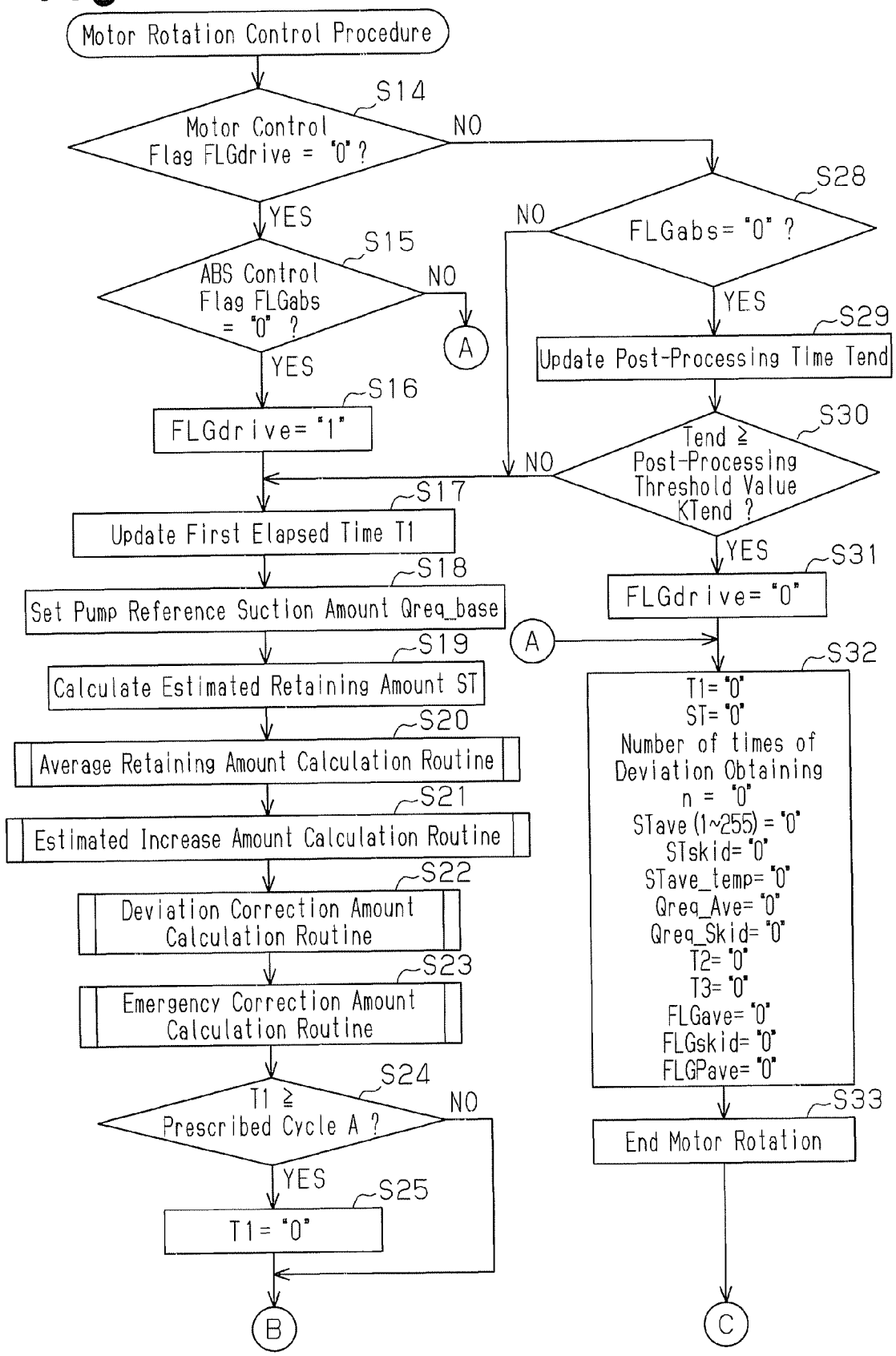
FIG. 4 is a flowchart representing a motor control routine.
Figure 5:
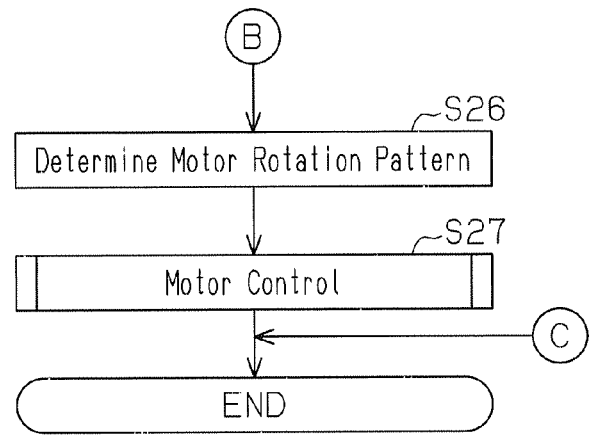
FIG. 5 is a flowchart representing the motor control routine, continuing from the flowchart of FIG. 4.

The flowcharts from steps S14 to S33 of FIGS. 4 and 5 represent the motor control routine of step S8.

In step S14, the ECU 18 determines whether the motor rotation flag FLGdrive is "0". The motor rotation flag FLGdrive is set to "1" when rotation of the motor M is controlled and "0" when such rotation is not controlled.

If a positive determination is made in step S14, that is, if the motor M is not controlled, the ECU 18 determines whether the ABS control flag FLGabs is "1" in step S15.

If a determination is positive in step S15, the ECU 18 determines that it is immediately after the ABS control has started. In this case, in step S16, the ECU 1B sets the motor rotation flag FLGdrive to "1" and then performs step S17.

In step S17, the ECU 18 updates the first elapsed time T1. The first elapsed time T1 represents the time elapsed since the start of the current prescribed cycle A. In other words, the ECU 18 updates the first elapsed time T1 by incrementing the value by 0.01 seconds corresponding to a cycle t of the ABS control routine. With reference to FIG. 10(a), the duration of each prescribed cycle A is set to such a value that the fluid pressure fluctuation cycle is repeated for a plurality of times in the single prescribed cycle A. In the illustrated embodiment, the prescribed cycle A corresponds to 0.5 second. The duration of the specified cycle A may be referred to as a "cycle threshold value KT1".

Figure 2:
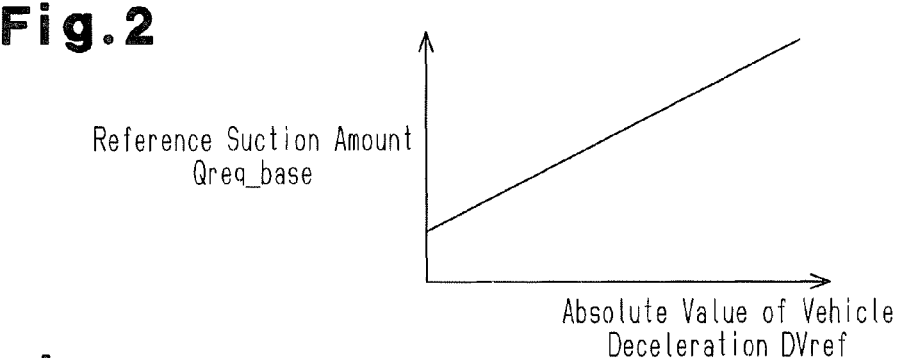
FIG. 2 is a map representing the relationship between the absolute value of deceleration of the vehicle and the reference suction amount.

In step S18, the ECU 18 sets the reference suction amount Qreq_base in correspondence with the absolute value of the vehicle deceleration DVref, which is calculated in step S3, with reference to the map of FIG. 2. In other words, the ECU 18 functions as a reference suction amount setting section.

The map of FIG. 2 represents the relationship between the absolute value of the vehicle deceleration DVref and the reference suction amount Qreq_base of the pumps 31, 32. The unit of the suction amount of each pump 31, 32 is represented by a flow rate. The reference suction amount Qreq_base represents the reference value of the suction amount of each pump 31, 32. That is, using the map of FIG. 2, the reference suction amount Qreq_base of the pumps 31, 32 is set in correspondence with the absolute value of the vehicle deceleration DVref. Driving modes of the motor M are set with reference to the reference suction amount Qreq_base of the pumps 31, 32. The greater the absolute value of the vehicle deceleration DVref is, the greater the reference suction amount Qreq_base is set.

If the depression amount of the brake pedal 20 depressed by the driver is constant while the vehicle is traveling, the absolute value of the vehicle deceleration DVref changes in correspondence with the μ value, or the friction coefficient, of the road surface on which the vehicle travels. In other words, the absolute value of the vehicle deceleration DVref increases as the μ value of the road surface rises. The greater the μ value of the road surface is, the greater the reference suction amount Qreq_base the ECU 18 sets.

In step S19, the ECU 18 calculates the estimated retaining amount ST of the brake fluid in each of the reservoirs 29, 30. In other words, the estimated retaining amount ST is an estimated reservoir retaining amount representing the amount of the brake fluid temporarily retained in each reservoir 29, 30.

A cycle in which the estimated retaining amount ST increases and decreases in the ABS control corresponds to the fluid pressure fluctuation cycle in each wheel cylinder 19a to 19d. For example, if the brake fluid pressure in each of the wheel cylinders 19a to 19d is to be lowered while the ABS control is being performed, the ECU 18 holds the second on-off valves 25 to 28 in open states. In this case, the estimated retaining amount ST of each reservoir 29, 30 gradually increases. Contrastingly, if the brake fluid pressure in each wheel cylinder 19a to 19d is to be maintained constant or increased, the ECU 18 holds the second on-off valves 25 to 28 in closed states. In this case, the estimated retaining amount ST of each reservoir 29, 30 gradually lowers since the brake fluid is introduced out of the reservoir 29, 30 through the corresponding pump 31, 32.

Thus, if each pump 31, 32 is controlled in such a manner that the suction amount remains constant in a certain period of the ABS control, which is, for example, the prescribed cycle A, the change amount of the estimated retaining amount ST is estimated. Specifically, in step S19, the ECU 18 calculates the estimated retaining amount ST on the assumption that each pump 31, 32 has sucked a constant amount of brake fluid in the certain period of the ABS control.

Figure 6:
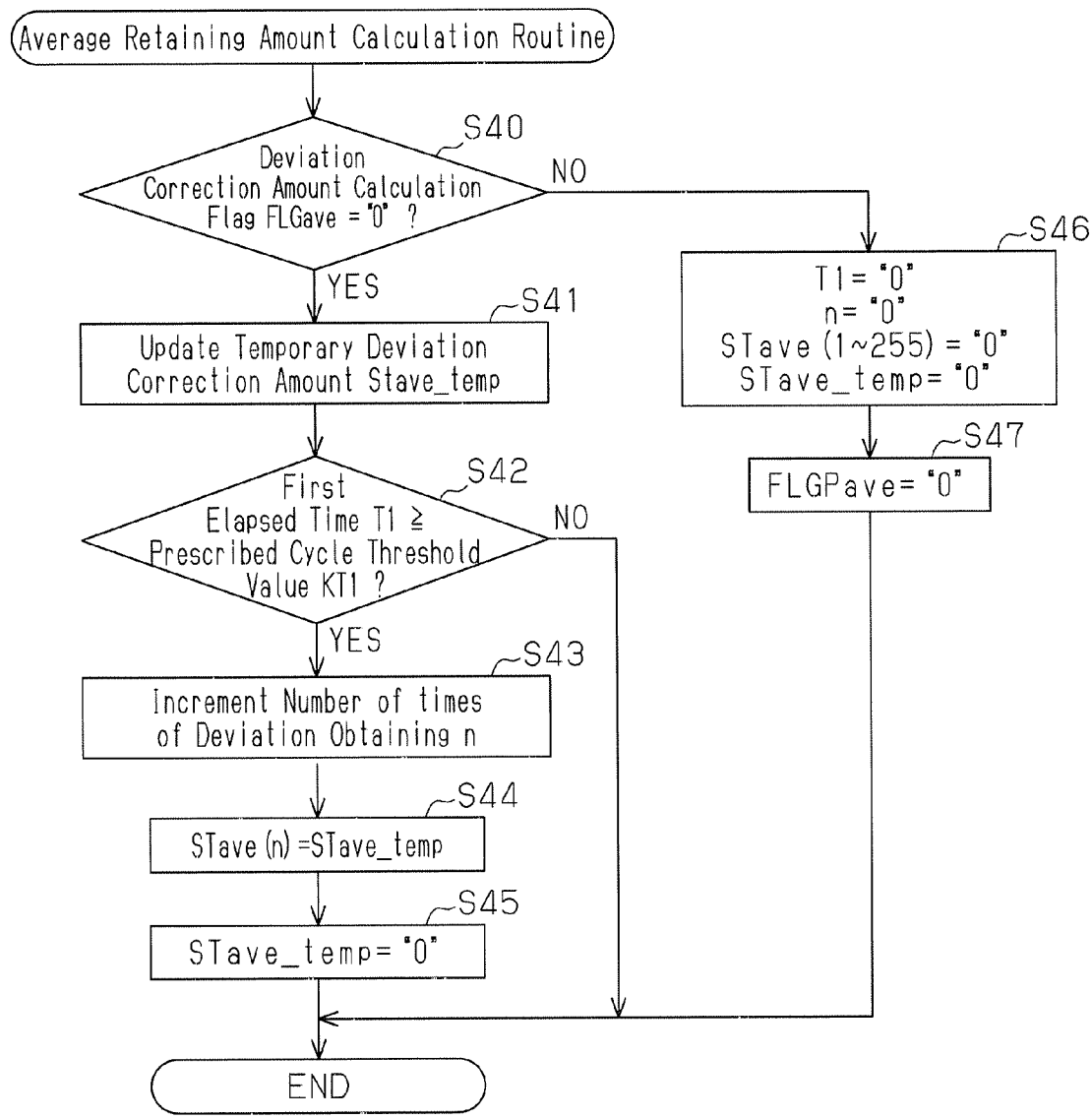
FIG. 6 is a flowchart representing an average retaining amount calculation routine.

In step S20, the ECU 18 calculates the average retaining amount STave(n) of the reservoirs 29, 30 by carrying out the average retaining amount calculation routine of FIG. 6. The graph of FIG. 10(a) and the graph of FIG. 12(a) represent the average retaining amount STave(n). The number of times of deviation obtaining n is any integer from "1" to "255". The average retaining amount STave(n) represents a time average of the retaining amount of the brake fluid in the reservoirs 29, 30 in the current prescribed cycle A, as determined on the assumption that the suction amount of each pump 31, 32 has been constant in the prescribed cycle A. The average retaining amount may be referred to as an "estimated retaining amount deviation". That is, the ECU 18 functions also as an average retaining amount estimating section.

Figure 7:
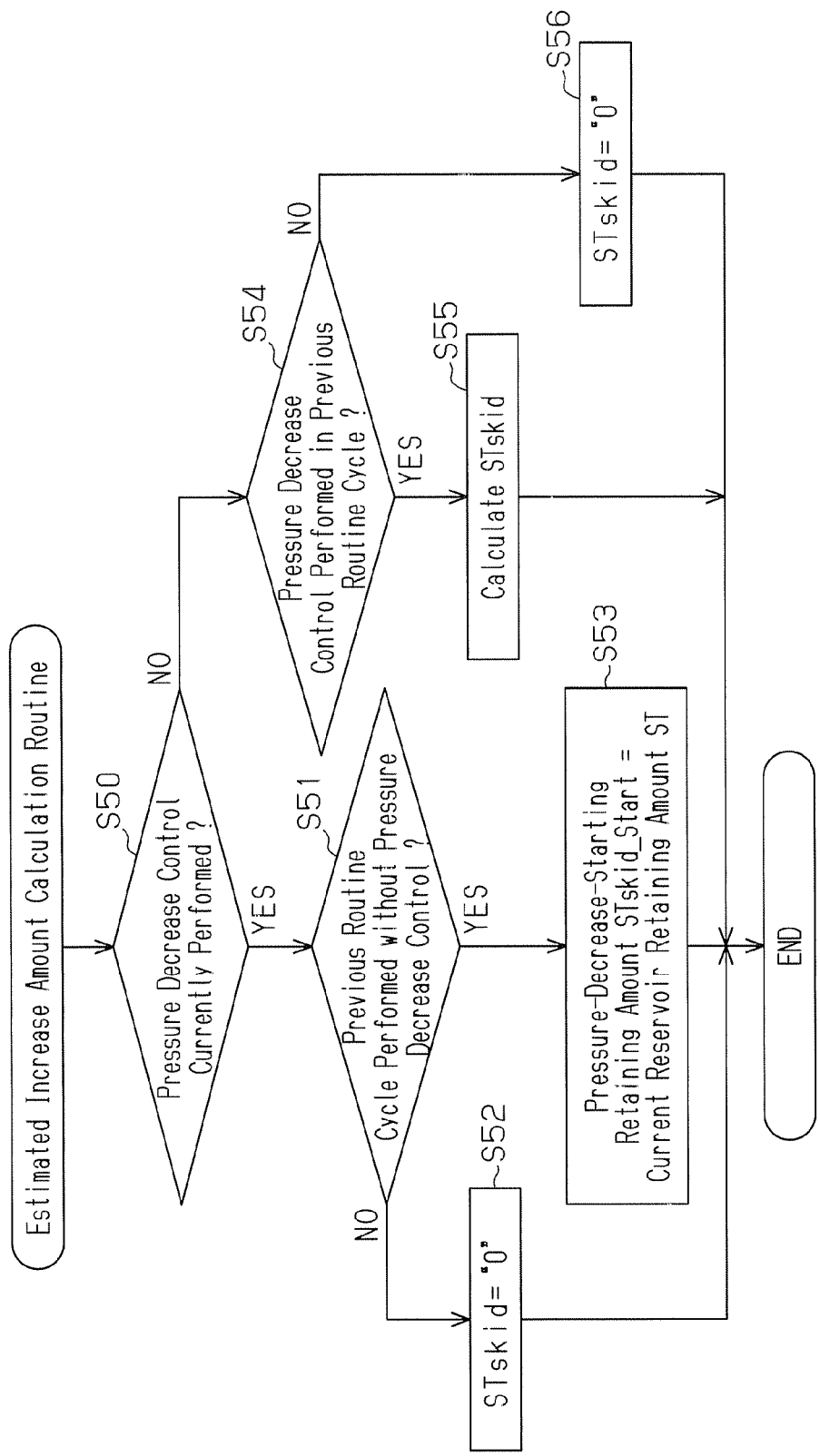
FIG. 7 is a flowchart representing an estimated increase amount calculation routine.

In step S21, the ECU 18 calculates the estimated increase amount STskid by performing the estimated increase amount calculation routine of FIG. 7. FIGS. 11(a) and 12(a) represent the estimated increase amount STskid. The estimated increase amount STskid is the estimated increase amount of the estimated retaining amount ST in the period in which the brake fluid in the reservoirs 29, 30 increases.

Figure 8:
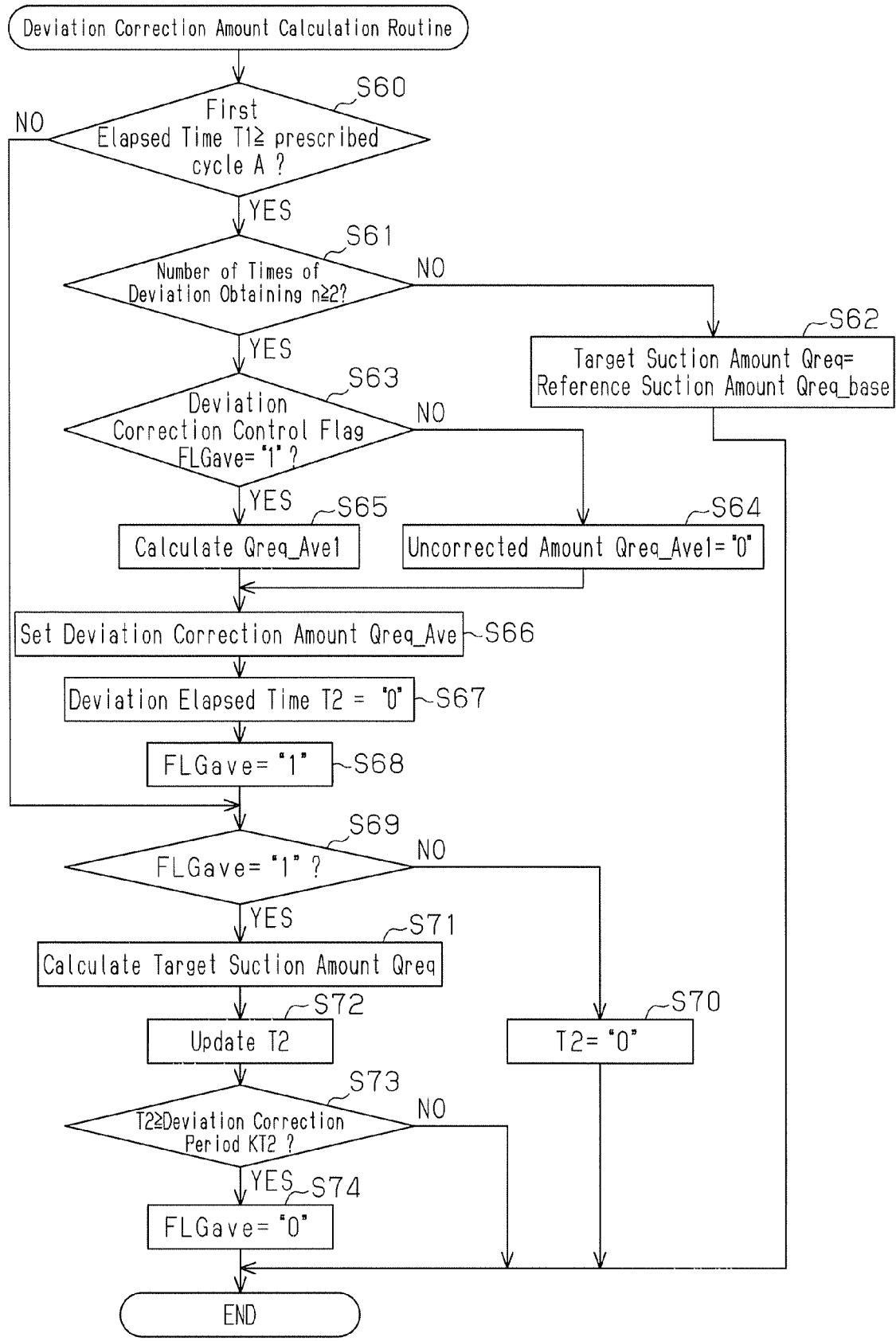
FIG. 8 is a flowchart representing a deviation correction amount calculation routine.

In step S22, the ECU 18 carries out the deviation correction amount calculation routine of FIG. 8. Specifically, the ECU 18 obtains the deviation correction amount Qreq_Ave using the average retaining amount STave(n), which is determined in step S20. FIGS. 10(c) and 12(c) represent the deviation correction amount Qreq_Ave. Further, the ECU 18 calculates the target suction amount Qreq using the deviation correction amount Qreq_Ave. The deviation correction amount calculation routine may be referred to as the "first correcting procedure".

Figure 9:
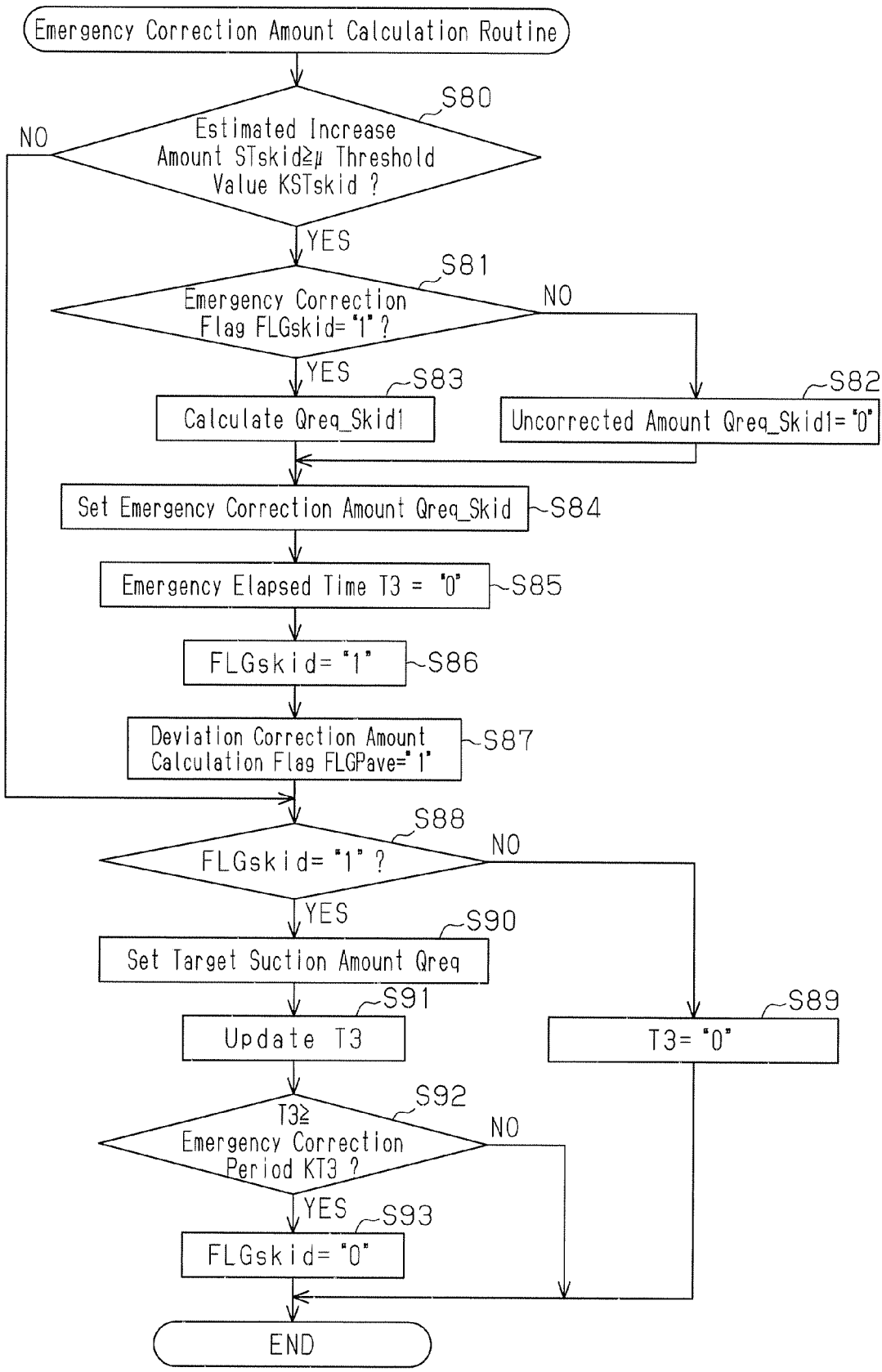
FIG. 9 is a flowchart representing an emergency correction amount calculation routine.
Figure 10:
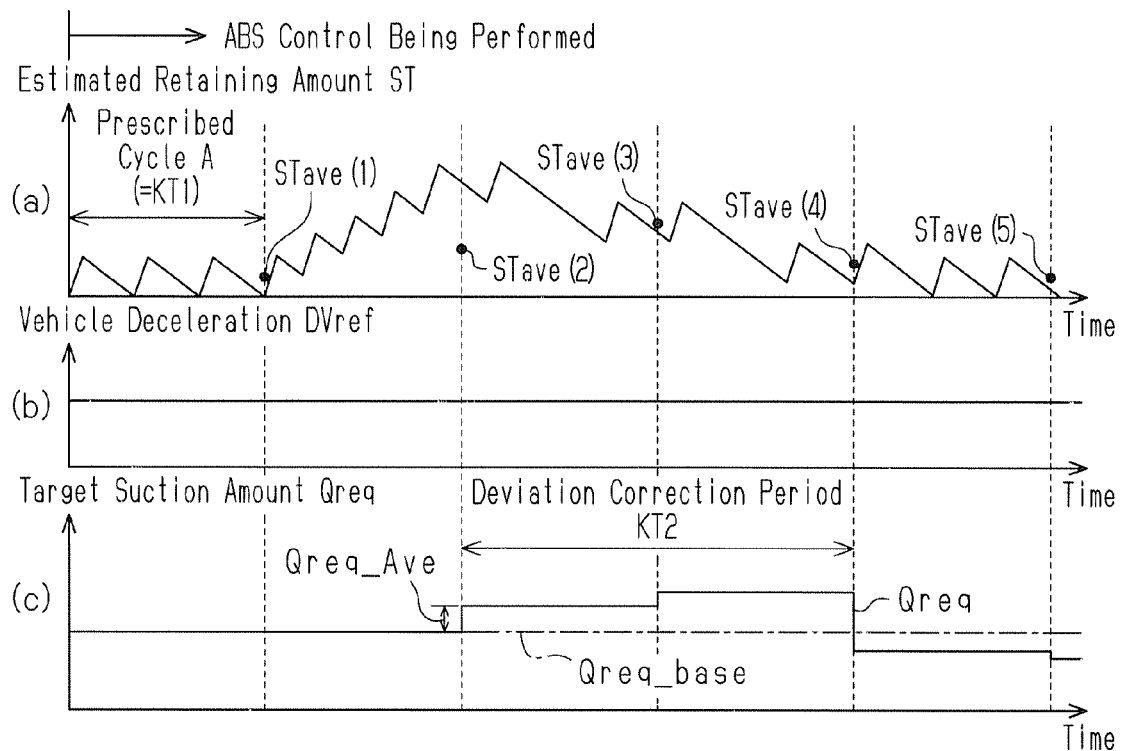
FIG. 10(a) is a timing chart representing the estimated retaining amount by which deviation pump control is illustrated.
FIG. 10(b) is a timing chart representing the absolute value of the vehicle deceleration.
FIG. 10(c) is a timing chart representing the target suction amount.
Figure 11:
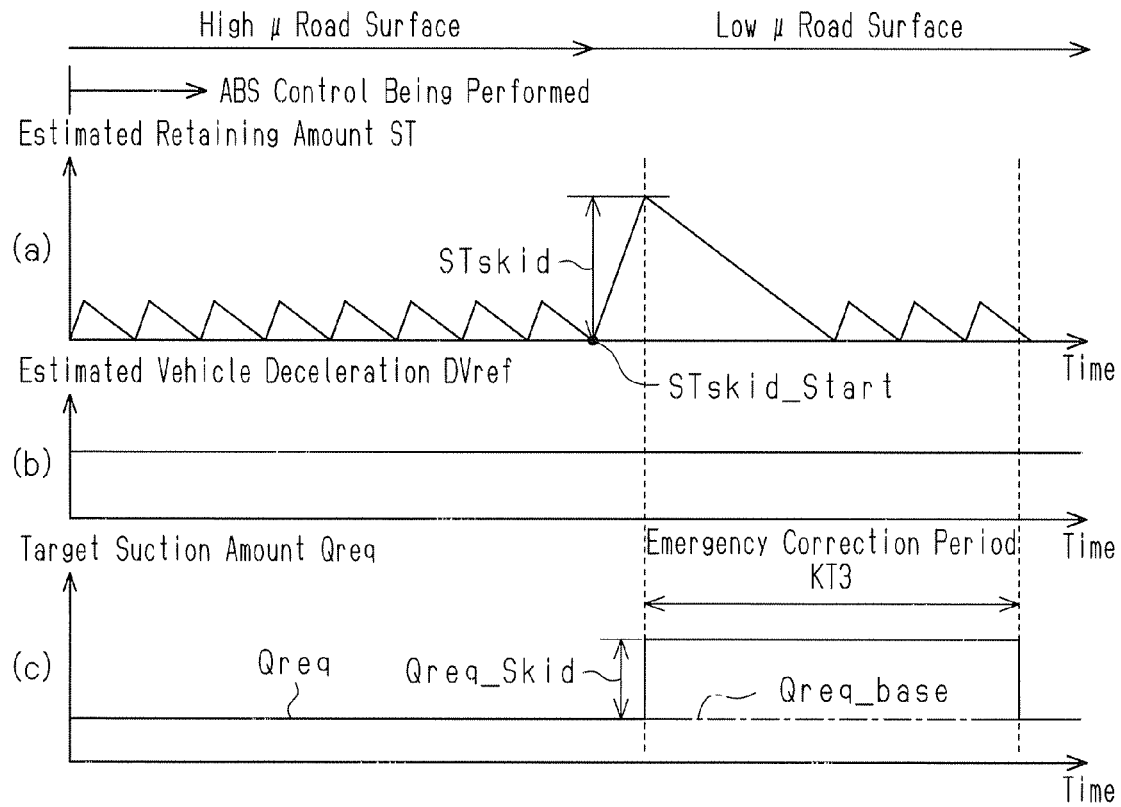
FIG. 11(a) is a timing chart representing the estimated retaining amount, by which emergency pump control is illustrated.
FIG. 11(b) is a timing chart representing the absolute value of the vehicle deceleration.
FIG. 11(c) is a timing chart representing the target suction amount.
Figure 12:
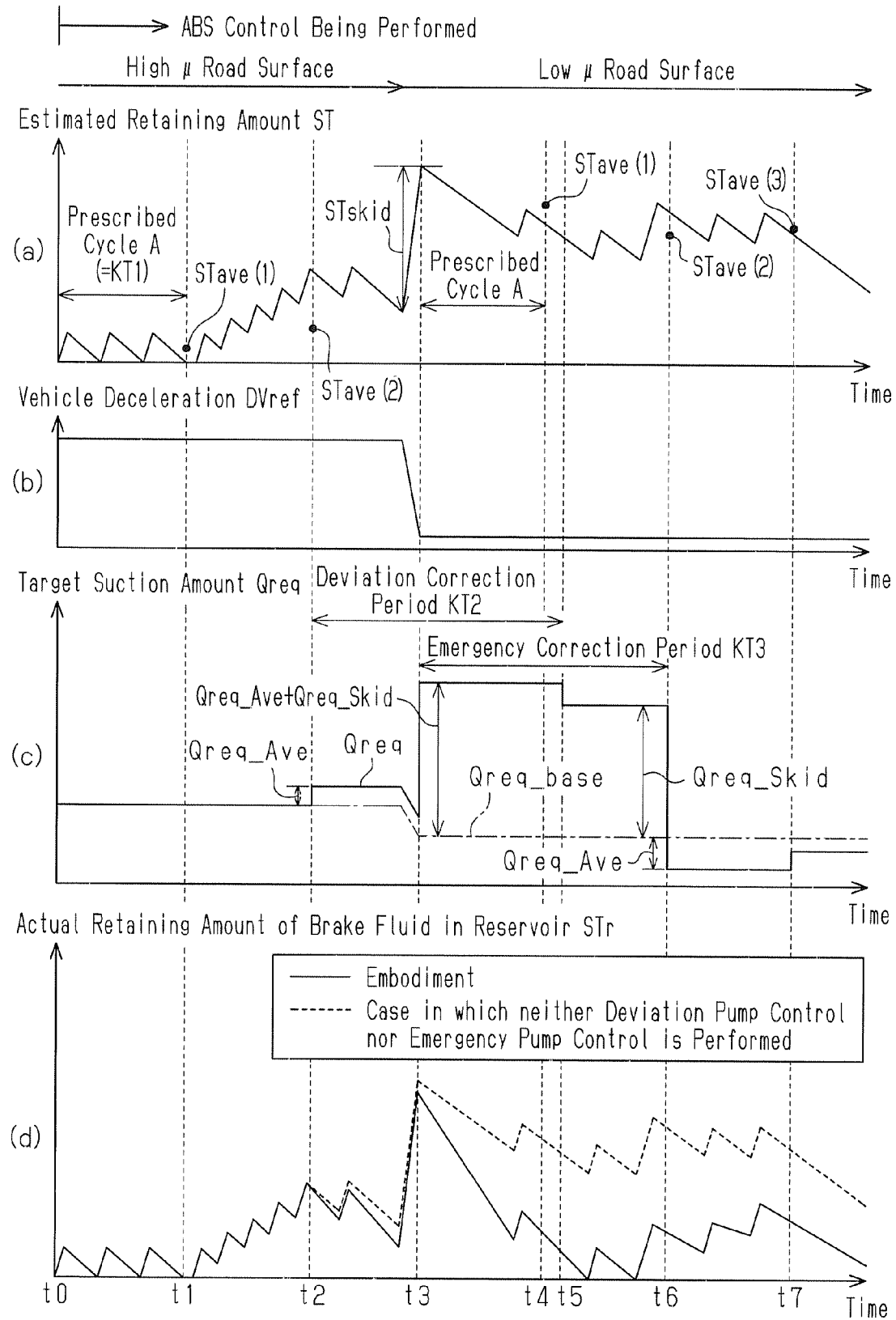
FIG. 12(a) is a timing chart representing the estimated retaining amount by which the deviation pump control and the emergency pump control are both illustrated.
FIG. 12(b) is a timing chart representing the absolute value of the vehicle deceleration.
FIG. 12(c) is a timing chart representing the target suction amount.
FIG. 12(d) is a timing chart representing the actual retaining amount.

In step S23, the ECU 18 carries out the emergency correction amount calculation routine of FIG. 9. Specifically, the ECU 18 calculates the emergency correction amount Qreq_Skid using the estimated increase amount STskid determined in step S22. FIGS. 11(c) and 12(c) represent the emergency correction amount Qreq_Skid. Further, the ECU 18 obtains the target suction amount Qreq using the emergency correction amount Qreq_Skid. The emergency correction amount calculation routine may be referred to as the "second correcting procedure".

In step S24, the ECU 18 determines whether the first elapsed time T1 determined in step S17 is greater than or equal to the duration of each prescribed cycle A.

If the determination is positive in step S24, the ECU 18 determines that the current prescribed cycle A has ended. In this case, the ECU 18 resets the first elapsed time T1 to "0" in step S25 and then performs step S26. If a negative determination is made in step S24, that is, it the first elapsed time T1 is less than the duration of the prescribed cycle A, the ECU 18 performs step S26 without altering the first elapsed time T1.

In step S26, the ECU 18 determines the drive pattern of the motor M in such a manner as to control the pumps 31, 32 in order to achieve at least one of the target suction amount Qreq obtained in step S22 and the target suction amount Qreq obtained in step S23.

In step S27, the ECU 18 controls the motor M in accordance with the drive pattern determined in step S26. The ECU 18 then suspends the ABS control routine.

In other words, the ECU 18 functions as a control section that performs deviation pump control or emergency pump control.

If a negative determination is made in step S14, that is, if the motor M is in control, the ECU 18 performs step S28.

In step S28, the ECU 18 determines whether the ABS control flag FLGabs is "0". If a negative determination is made in step S28, that is, if the ABS control is being performed, the ECU 18 performs step S17.

If the determination is positive in step S28, that is, if the ABS control is not being performed, the ECU 18 updates the post-processing time Tend in step S29.

In step S30, the ECU 18 determines whether the post-processing time Tend is greater than or equal to the post-processing threshold value KTend. The post-processing threshold value KTend is a certain period of time in which rotation of the motor M is continuously ensured after the ABS control is ended. The post-processing threshold value KTend is determined in advance through tests or simulations. The post-processing threshold value KTend is, for example, 0.5 second.

If a negative determination is made in step S30, that is, if the post-processing time Tend is less than the post-processing threshold value KTend, the ECU 18 performs step S17.

If a determination of step S33 is positive, that is, if the post-processing time Tend is greater than or equal to the post-processing threshold value KTend, the ECU 18 resets the motor rotation flag FLGdrive to "0" in step S31 and then performs step S32.

In step S32, the ECU 18 resets the first elapsed time T1, the estimated retaining amount ST, the number of times of deviation obtaining n, the average retaining amount STave(n), the estimated increase amount STskid, the temporary deviation correction amount STave_temp, the deviation correction amount Qreq_Ave, the emergency correction amount Qreq_Skid, the deviation elapsed time T2, the emergency elapsed time T3, the deviation correction flag FLGave, the emergency correction flag FLGskid, and the deviation correction amount calculation flag FLGPave to "0".

In step S33, the ECU 18 ends control of rotation of the motor M and then suspends the ABS control routine.

The flowchart of steps S40 to S47 in FIG. 6 represents the average retaining amount calculation routine of step S20.

In step S40, the ECU 18 determines whether the deviation correction amount calculation flag FLGPave is "0". If the average retaining amount STave(n) is to be reset, the deviation correction amount calculation flag FLGPave corresponds to "1". If the average retaining amount STave(n) is not to be reset, the deviation correction amount calculation flag FLGPave corresponds to "0".

If a determination is positive in step S40, that is, if the average retaining amount STave(n) is not to be reset, the ECU 18 updates the temporary deviation correction amount STave_temp in accordance with the following expression 1 in step S41.

$$STave\_temp \leftarrow STave\_temp + (ST \times t/A) \qquad \text{Expression 1}$$

In the expression, ST represents a current estimated retaining amount and t represents a cycle by which the ABS control routine is executed.

Specifically, in step S41, the ECU 18 prepares a flattening filter. The ECU 18 assigns a value obtained in the preparation to the temporary deviation correction amount STave_temp.

In step S42, the ECU 18 determines whether the first elapsed time T1 obtained in step S17 is greater than or equal to the duration of each prescribed cycle A. If a negative determination is made in step S42, that is, if the first elapsed time T1 is less than the duration of the prescribed cycle A, the ECU 18 ends the average retaining amount calculation routine.

If a determination of step S42 is positive, that is, if the first elapsed time T1 is greater than or equal to the duration of the prescribed cycle A, the ECU 18 increments the number of times of deviation obtaining n by "1" in step S43.

In step S44, the ECU 18 assigns the temporary deviation correction amount STave_temp determined in step S41 to the average retaining amount STave(n).

In step S45, the ECU 18 resets the temporary deviation correction amount STave_temp to "0" and ends the average retaining amount calculation routine.

With reference to FIG. 10(a), each time the prescribed cycle A comes to an end, the ECU 18, while performing the average retaining amount calculation routine, calculates the average retaining amount STave(n), which is a time average value of the reservoirs 29, 30 in the ended prescribed cycle A. For example, when the first prescribed cycle A comes to an end since the ABS control has started, the number of times of deviation obtaining n corresponds to "1" and the ECU 18 calculates the average retaining amount STave(1). When the second prescribed cycle A ends, the number of times of deviation obtaining n corresponds to "2" and the ECU 18 determines the average retaining amount STave(2). In other words, the ECU 18 functions as an average retaining amount calculating section.

If a determination is negative in step S40, the ECU 18 resets the first elapsed time T1, the number of times of deviation obtaining n, the average retaining amount STave(n), and the temporary deviation correction amount STave_temp to "0" in step S46.

In step S47, the ECU 18 resets the deviation correction amount calculation flag FLGPave to "0" and ends the average retaining amount calculation routine.

The flowchart of steps S50 to S56 in FIG. 7 represents the estimated increase amount calculation routine of step S21.

In step S50, the ECU 18 determines whether the second on-off valves 25 to 28 are each held in an open state.

If a positive determination is made in step S50, the ECU 18 determines that the wheel cylinders 19a to 19d are being subjected to the pressure decrease control. In this case, in step S51, the ECU 18 determines whether the previous cycle of the estimated increase amount calculation routine was performed without the pressure decrease control.

If a negative determination is made in step S51, that is, if the pressure decrease control was being performed in the previous cycle of the estimated increase amount calculation routine, the ECU 18 resets the estimated increase amount STskid to "0" in step S52, thus ending the estimated increase amount calculation routine.

If the determination is positive in step S51, that is, if the previous cycle of the estimated increase amount calculation routine was performed with the pressure decrease control, the ECU 18 in the Step S53 determines that it is immediately after the pressure decrease control has started. In this case, the ECU 18 assigns the estimated retaining amount ST obtained in step S19 to a pressure-decrease-starting retaining amount STskid_Start. The ECU 18 then ends the estimated increase amount calculation routine.

If the determination is negative in step S50, that is, if the wheel cylinders 19a to 19d are not currently subjected to the pressure decrease control, the ECU 18 determines whether the pressure decrease control in step S54 was performed in the previous cycle of the estimated increase amount calculation routine.

If a positive determination is made in step S54, the ECU 18 determines that it is immediately after the pressure decrease control has been ended. In this case, in step S55, the ECU 18 calculates the estimated increase amount STskid of the brake fluid in the reservoirs 29, 30 from when the estimated retaining amount ST has started to increase to when such increase of the estimated retaining amount ST has come to an end, using the following expression 2. The ECU 18 then ends the estimated increase amount calculation routine. FIG. 11(a) represents the estimated increase amount STskid.

$$STskid = ST - STskid\_Start \qquad \text{Expression 2}$$

In the expression 2, ST represents the estimated retaining amount immediately after the pressure decrease control has ended.

If the determination in step S54 is negative, the ECU 18 resets the estimated increase amount STskid to "0" in step S56 and ends the estimated increase amount calculation routine.

The flowchart of steps S60 to S74 in FIG. 8 represents the deviation correction amount calculation routine of step S22.

In step S60, the ECU 18 determines whether the first elapsed time T1 obtained in step S17 is greater than or equal to the duration of the prescribed cycle A.

If a positive determination is made in step S60, that is, if the first elapsed time T1 is greater than or equal to the duration of the prescribed cycle A, the ECU 18 determines whether the number of times of deviation obtaining n is greater than or equal to "2" in step S61.

If the determination in step S61 is negative, that is, if the number of times of deviation obtaining n is smaller than or equal to 1, the ECU 18 assigns the reference suction amount Qreq_base to the target suction amount Qreq in step S62 and ends the deviation correction amount calculation routine.

If a positive determination is made in step S61, that is, if the number of times of deviation obtaining n is greater than or equal to 2, the ECU 18 determines whether the deviation correction flag FLGave is "1" in step S63. The deviation correction flag FLGave is set to "1" during the deviation pump control and "0" when the deviation pump control is not performed.

If the determination in step S63 is positive, that is, if the deviation pump control is being performed, the ECU 18 calculates an uncorrected amount Qreq_Ave1 in step S65. The uncorrected amount Qreq_Ave1 is determined using the deviation correction amount Qreq_Ave that has been previously set and in accordance with the following expression 3.

$$Qreq\_Ave1 = Qreq\_Ave \times (KT2 - T2)/KT2 \qquad \text{Expression 3}$$

In the expression 3, KT2 represents a deviation correction period. The deviation correction period KT2 represents the period of time in which the deviation pump control needs to be performed. T2 represents a deviation elapsed time. The deviation elapsed time T2 represents the time that has elapsed since the start of the deviation pump control. The deviation correction period KT2 is set in advance to a value greater than the duration of the prescribed cycle A. In the illustrated embodiment, the deviation correction period KT2 is set to a value twice as great as the duration of the prescribed cycle A, which is 1 second. The deviation elapsed time T2 may be referred to as a "second elapsed time".

With reference to FIG. 10(c), at the point of time when the third prescribed cycle A ends, the ECU 18 continuously performs the deviation pump control in accordance with the deviation correction amount Qreq_Ave that has been set at the point of time when the second prescribed cycle A has ended. In other words, at the point of time when the current prescribed cycle A comes to an end, the ECU 18 continuously performs the deviation pump control in accordance with the deviation correction amount Qreq_Ave that has been set at the point of time when the previous prescribed cycle A has come to an end. Thus, if the deviation correction amount Qreq_Ave is to be set to a new value, the deviation correction amount Qreq_Ave that has been set at the end of the previous prescribed cycle A needs to be taken into consideration. The expression 3 thus includes the deviation correction amount Qreq_Ave.

If the determination in step S63 is negative, that is, if the deviation pump control is not currently performed, the ECU 18 sets the uncorrected amount Qreq_Ave1 to "0" in step S64. The ECU 18 then performs step S66.

In step S66, the ECU 18 calculates a new deviation correction amount Qreq_Ave using the following expression 4, so that, since the current prescribed cycle A has come to an end, the deviation pump control can be resumed in accordance with the new deviation correction amount Qreq_Ave.

$$Qreq\_Ave = Qreq\_Ave1 + (STave(n)STave(n-1))/KT2 \qquad \text{Expression 4}$$

In the expression, STave(n) represents the average retaining amount of the current prescribed cycle A. STave(n−1) represents the average retaining amount of the previous prescribed cycle A.

In this manner, the ECU 18 calculates the deviation between the average retaining amount STave(n), which is obtained at the end of the current prescribed cycle A, and the average retaining amount STave(n−1), which has been determined at the end of the previous prescribed cycle A. The greater the deviation is, the greater the deviation correction amount Qreq_Ave the ECU 18 sets. In other words, the ECU 18 functions as a deviation correction amount setting section.

In step S67, the ECU 18 resets the deviation elapsed time T2 to "0". In step S68, the ECU 18 sets the deviation correction flag FELGave to "1" and then performs step S69. If the determination in step S60 is negative, that is, if the first elapsed time T1 is less than the duration of the prescribed cycle A, the ECU 18 also performs step S69.

In step S69, the ECU 18 determines whether the deviation correction flag FLGave is "1". If a positive determination is made in step S69, that is, if the deviation pump control is currently performed, the ECU 18 calculates the target suction amount Qreq using the following expression 5 in step S71.

$$Qreq = Qreq\_base + Qreq\_Ave \qquad \text{Expression 5}$$

That is, the ECU 18 sets the target suction amount Qreq to the sum of the reference suction amount Qreq_base and the deviation correction amount Qreq_Ave.

In step S72, the ECU 18 updates the deviation elapsed time T2. In step S73, the ECU 18 determines whether the deviation elapsed time T2 is greater than or equal to the duration of the deviation correction period KT2. If the determination is positive in step S73, that is, if the deviation elapsed time T2 is greater than or equal to the duration of the deviation correction period KT2, the ECU 18 resets the deviation correction flag FLGave to "0" to end the deviation pump control in step S74. The ECU 18 thus ends the deviation correction amount calculation routine.

If a negative determination is made in step S73, that is, if the deviation elapsed time T2 is less than the duration of the deviation correction period KT2, the ECU 18 suspends the deviation correction amount calculation routine. If the determination in step S69 is negative, that is, if the deviation pump control is not being performed, the ECU 18 resets the deviation elapsed time T2 to "0" in step S70 and ends the deviation correction amount calculation routine.

The flowchart of steps S80 to S93 in FIG. 9 represents the emergency correction amount calculation routine of step S23.

In step S80, the ECU 18 determines whether the estimated increase amount STskid obtained in step S55 of step S21 is greater than or equal to a μ threshold value KSTskid.

The μ threshold value KSTskid is set in advance as a threshold value in accordance with which whether the μ value is changed is determined.

If the road surface on which the vehicle travels changes from a high μ road surface to a low μ road surface when the ABS control is being performed, the amount of the brake fluid flowing from the wheel cylinders 19a to 19d to the reservoirs 29, 30 in the fluid pressure fluctuation cycle rapidly increases. Thus, if the determination in step S80 is positive, it is indicated that the road surface on which the vehicle travels has changed from the high μ road surface to the low μ road surface.

If determination in step S80 is positive, that is, if the road surface on which the vehicle travels has changed from the high μ road surface to the low is road surface, the ECU 18 determines whether the emergency correction flag FLGskid is "1" in step S81. The emergency correction flag FLGskid is set to "1" when the emergency pump control is being performed, and to "0" when the emergency pump control is not being performed.

If a negative determination is made in step S81, that is, if the emergency pump control is not being performed, the ECU 18 sets the uncorrected amount Qreq_Skid1 to "0" in step S82. The ECU 18 then performs step S84.

If the determination is positive in step S81, that is, if the emergency pump control is being performed, the ECU 18 calculates the uncorrected amount Qreq_Skid1 using the following expression 6 in step S83.

The expression 6 includes the emergency correction amount Qreq_Skid that has been set in the previous cycle. Specifically, if the emergency correction amount Qreq_Skid is to be set to a new value in accordance with which the deviation pump control is to be performed, the emergency correction amount Qreq_Skid that has been already set needs to be taken into consideration.

$$Qreq\_Skid1 = Qreq\_Skid \times (KT3 - T3)/KT3 \qquad \text{Expression 6}$$

KT3 represents an emergency correction period. The emergency correction period KT3 represents the period of time in which the emergency pump control needs to be performed. T3 represents an emergency elapsed time. The emergency elapsed time T3 represents the time elapsed since the start of the emergency pump control. In the illustrated embodiment, the duration of the emergency correction period KT3 is set in advance to a value equal to the duration of the deviation correction period KT2. That is, the duration of the emergency correction period KT3 is 1 second. The emergency correction period KT3 may be referred to as a "third elapsed time".

In step S84, the ECU 18 calculates a new value of the emergency correction amount Qreq_Skid using the following expression 7 in step S84, so that the emergency pump control can be performed in accordance with the new value.

$$Qreq\_Skid = Qreq\_Skid1 + STskid/KT3 \qquad \text{Expression 7}$$

As illustrated in FIG. 11(c), the greater the estimated increase amount STskid is, the greater the emergency correction amount Qreq_Skid the ECU 18 sets. In other words, the ECU 18 functions as an emergency correction amount setting section.

In step S85, the ECU 18 resets the emergency elapsed time T3 to "0".

In step S86, the ECU 18 sets the emergency correction flag FLGskid to "1". In step S87, the ECU 18 sets the deviation correction amount calculation flag FLGPave to "1" to reset the average retaining amount STave(n) in step S87 and then performs step S88. If the determination is negative in step S80, that is, if the road surface on which the vehicle travels has not changed from the high μ road surface to the low μ road surface, the ECU 18 also performs step S88.

In step S88, the ECU 18 determines whether the emergency correction flag FLGSkid is "1".

If a positive determination is made in step S88, that is, if the emergency pump control is being performed, the ECU 18 calculates the target suction amount Qreq using the following expression 8 in step S90.

$$Qreq \leftarrow Qreq + Qreq\_Skid \qquad \text{Expression 8}$$

If a condition for starting the emergency pump control is satisfied when the deviation pump control is currently performed, the ECU 18 sets the sum of the target suction amount Qreq obtained in the deviation correction amount calculation routine and the emergency correction amount Qreq_Skid to the target suction amount Qreq.

In step S91, the ECU 18 updates the emergency elapsed time T3. In step S92, the ECU 18 determines whether the emergency elapsed time T3 is greater than or equal to the duration of the emergency correction period KT3. If the determination in step S92 is positive, that is, if the emergency elapsed time T3 is greater than or equal to the duration of the emergency correction period KT3, the ECU 18 resets the emergency correction flag FLGskid to "0" in step S93 and ends the emergency correction amount calculation routine.

If the determination is negative in step S92, that is, if the emergency elapsed time T3 is less than the duration of the emergency correction period KT3, the ECU 18 ends the emergency correction amount calculation routine. Also, if a negative determination is made in step S88, that is, if the emergency pump control is not currently performed, the ECU 18 resets the emergency elapsed time T3 to "0" in step S89 and ends the emergency correction amount calculation routine.

The timing charts of FIGS. 10(a) to 10(c) represent the average retaining amount STave(n), the vehicle deceleration DVref, and the target suction amount Qreq when the absolute value of the vehicle deceleration DVref is maintained constant in the ABS control. In this case, the ECU 18 performs the deviation pump control.

As illustrated in FIG. 10(c), the ECU 18 sets the reference suction amount Qreq_base to a constant value in correspondence with the absolute value of the vehicle deceleration DVref based on the graph of FIG. 2. With reference to FIG. 10(a), when the first prescribed cycle A ends after the ABS control has started, the ECU 18 calculates the average retaining amount STave(1) of the first prescribed cycle A. When the second prescribed cycle A comes to an end, the ECU 18 determines the average retaining amount STave(2) of the second prescribed cycle A.

The ECU 18 calculates the deviation correction amount Qreq_Ave based on the deviation between the average retaining amount STave(1) and the average retaining amount STave(2). The ECU 18 sets the target suction amount Qreq to the sum of the deviation correction amount Qreq_Ave and the reference suction amount Qreq_base.

In the deviation correction period KT2, the ECU 18 performs the deviation pump control.

When the third prescribed cycle A ends in the deviation pump control, the ECU 18 calculates the average retaining amount STave(3) of the third prescribed cycle A. The ECU 18 determines a new value of the deviation correction amount Qreq_Ave for the fourth prescribed cycle A in correspondence with the average retaining amount STave(3). The ECU 18 sets the target suction amount Qreq for the fourth prescribed cycle A and performs the deviation pump control correspondingly.

To facilitate explanation about the emergency pump control, the timing charts of FIGS. 11(a) to 11(c) are provided on the assumption as follows. Specifically, such assumption is that, although the road surface on which the vehicle travels has changed from the high μ road surface to the low μ road surface, the absolute value of the vehicle deceleration DVref is maintained constant. In other words, on the assumption that the absolute value of the vehicle deceleration DVref is maintained constant as illustrated in FIG. 11(b), the reference suction amount Qreq_base is maintained as a constant value with reference to FIG. 11(c). In this manner, illustration of the emergency correction amount Qreq_Skid is facilitated.

If the estimated increase amount STskid increases excessively, the ECU 18 determines that the road surface on which the vehicle travels has changed from the high μ road surface to the low μ road surface. By carrying out the emergency correction amount calculation routine, the ECU 18 determines the emergency correction amount Qreq_Skid based on the estimated increase amount STskid.

The ECU 18 sets the sum of the emergency correction amount Qreq_Skid and the reference suction amount Qreq_base to the target suction amount Qreq. The ECU 18 performs the emergency pump control correspondingly as long as the emergency correction period TK3 lasts.

FIGS. 12(a) to 12(d) illustrate the case in which the road surface on which the vehicle travels changes from the high μ road surface to the low μ road surface in the ABS control. The ECU 18 performs both the deviation pump control and the emergency pump control.

If the brake pedal 20 is quickly operated by the driver when the vehicle is moving, the condition for starting the ABS control is satisfied and the ECU 18 starts to perform the ABS control at the time point t0. With reference to FIG. 12(a), the estimated retaining amount ST of the reservoirs 29, 30 repeatedly increases and decreases in an alternating manner in correspondence with the fluid pressure fluctuation cycle of each wheel cylinder 19a to 19d. When the first prescribed cycle A ends at the time point t1 after the ABS control has started, the ECU 18 determines the average retaining amount STave(1) of the first prescribed cycle A.

When the second prescribed cycle A ends at the time point t2, the ECU 18 calculates the average retaining amount STave (2) of the second prescribed cycle A. The ECU 18 sets the deviation correction amount Qreq_Ave based on the deviation between the average retaining amount STave(2) and the average retaining amount STave(1). The ECU 18 sets the reference suction amount Qreg_base based on the absolute value of the current vehicle deceleration DVref. The ECU 18 sets the target suction amount Qreq based on the sum of the reference suction amount Qreq_base and the deviation correction amount Qreq_Ave. Thus, in the third prescribed cycle A, the ECU 18 performs the deviation pump control in accordance with the target suction amount Qreq that has been set at the end of the second prescribed cycle A.

With reference to FIG. 12(b), if the road surface on which the vehicle travels changes from the high μ road surface to the low μ road surface in the third prescribed cycle A, the absolute value of the vehicle deceleration DVref sharply drops. Thus, as illustrated in FIG. 12(c), the ECU 18 sets the reference suction amount Qreq_base and the target suction amount Qreq to smaller values based on the absolute value of the vehicle deceleration DVref at the time point t3.

With reference to FIG. 12(a), in the fluid pressure fluctuation cycle immediately after the road surface on which the vehicle travels has changed from the high μ road surface to the low μ road surface, the flow rate of the brake fluid from the wheel cylinders 19a to 19d to the reservoirs 29, 30 increases. This rapidly raises the estimated retaining amount ST of the reservoirs 29, 30.

When the ECU 18 determines that the estimated increase amount STskid in the pressure decrease control in a single fluid pressure fluctuation cycle is greater than or equal to the μ threshold value KSTskid, the ECU 18 sets the emergency correction amount Qreq_Skid using the estimated increase amount STskid. The ECU 18 updates the target suction amount Qreq to the sum of the emergency correction amount Qreq_Skid and the target suction amount Qreg obtained in the deviation correction amount calculation routine. In this manner, at the time point t3, the ECU 18 starts the emergency pump control.

Specifically, as the road surface on which the vehicle travels changes from the high μ road surface to the low μ road surface, the ECU 18 controls the pumps 31, 32 in such a manner that the target suction amount Qreq including the emergency correction amount Qreq_Skid is achieved. In other words, the ECU 18 sets the target suction amount Qreq immediately after the road surface on which the vehicle travels has changed from the high μ road surface to the low μ road surface to the sum of the reference suction amount Qreq_base, the deviation correction amount Qreq_Ave, and the emergency correction amount Qreq_Skid. That is, the ECU 18 performs the deviation pump control and the emergency pump control at the same time.

When the deviation correction period KT2 ends at the time point t5, the ECU 18 ends the deviation pump control but continuously performs the emergency pump control solely. In other words, the ECO 18 sets the target suction amount Qreq to the sum of the reference suction amount Qreq_base and the emergency correction amount Qreq_Skid.

At the time point t4 when one prescribed cycle A ends after the emergency pump control has started, the ECU 18 calculates a new value of the average retaining amount STave(1). At the time point t6 when the second prescribed cycle A ends after the emergency pump control has started, the ECU 18 calculates the average retaining amount STave(2). At the time point t6, the ECU 18 sets the deviation correction amount Qreq_Ave based on the deviation between the average retaining amount STave(2) and the average retaining amount STave (1). The ECU 18 sets the target suction amount Qreq based on the sum of the deviation correction amount Qreq_Ave and the reference suction amount Qreq_base. Since the average retaining amount STave(2) corresponding to the low μ road surface is smaller than the average retaining amount STave (1), the deviation correction amount Qreq_Ave becomes a negative value. Thus, the ECU 18 sets the target suction amount Qreq to a value smaller than the reference suction amount Qreq_base.

In the illustrated embodiment, the emergency correction period KT3 is set to a duration twice as long as the duration of each prescribed cycle A. Thus, the time point t6 when the second prescribed cycle A comes to an end after the emergency pump control has started corresponds to the time point when the emergency correction period KT3 ends. The ECU 18 thus ends the emergency pump control at the time point t6 and starts the deviation pump control from this point of time. Specifically, at the time point t6 corresponding to the end of the emergency pump control, the ECU 18 sets the target suction amount Qreq for the deviation pump control.

In FIG. 12(d), the actual retaining amount STr of the reservoirs 29, 30 in the illustrated embodiment is represented by the solid lines. The actual retaining amount STr represents the actual retaining amount of the brake fluid in each of the reservoirs 29, 30. In FIG. 12(d), the chain lines represent as a comparative example the actual retaining amount STi when neither the deviation pump control nor the emergency pump control is performed. In the illustrated embodiment, the ECU 18 is capable of decreasing the actual retaining amount STr of the reservoirs 29, 30 compared to the comparative example (represented by the chain lines).

As has been described, when the ECU 18 determines that the road surface on which the vehicle travels has changed from the high μ road surface to the low μ road surface, the ECU 18 performs the emergency pump control. In other words, the ECU 18 sets the emergency correction amount Qreq_Skid using the estimated increase amount STskid and the target suction amount Qreq of the pumps 31, 32 using the emergency correction amount Qreq_Skid. Thus, regardless of that the road surface on which the vehicle travels has changed from the high μ road surface to the low μ road surface, the actual retaining amount STr of the reservoirs 29, 30 quickly decreases after having increased rapidly.

After decreasing the actual retaining amount STr to a value smaller than the threshold value, the ECU 18 ends the emergency pump control and performs the deviation pump control. The noise of the pumps 31, 32 of the case in which the deviation pump control is performed independently is less pronounced than that of the case in which the deviation pump control and the emergency pump control are both performed. Thus, after the ECU 18 decreases the actual retaining amount STr, the noise of the pumps 31, 32 is suppressed.

If the ECU 18 determines that the road surface on which the vehicle travels has not changed from the high μ road surface to the low μ road surface, the ECU 18 continuously performs the deviation pump control. In other words, the ECU 18 sets the target suction amount Qreq using the deviation correction amount Qreq_Ave. The ECU 18 is capable of decreasing the actual retaining amount STr compared to a case in which the deviation pump control is not performed.

The illustrated embodiment has the following advantages.

(1) The ECU 18 performs the deviation pump control while performing the ABS control. Specifically, when a certain prescribed cycle A comes to an end during the ABS control, the ECU 18 calculates the deviation between the average retaining amount STave(n) of the current prescribed cycle A and the average retaining amount STave(n−1) of the previous prescribed cycle A and sets the deviation correction amount Qreq_Ave based on the deviation. The ECU 18 sets the reference suction amount Qreq_base in correspondence with the μ value of the road surface on which the vehicle travels. The ECU 18 sets the target suction amount Qreq based on the sum of the deviation correction amount Qreq_Ave and the reference suction amount Qreq_base. The ECU 18 controls the pumps 31, 32 in such a manner that the pumps 31, 32 each suck the brake fluid by the amount corresponding to the target suction amount Qreq.

In the prior art, for example, operating modes of the pumps 31, 32 are changed each time a fluid pressure fluctuation cycle of the wheel cylinders 19a to 19d ends. Since the duration of each fluid pressure fluctuation cycle may vary from one cycle to another, the operating modes of the pumps 31, 32 are changed non-periodically in the prior art. However, in the deviation pump control of the illustrated embodiment, the operating modes of the pumps 31, 32 are changed for each of the prescribed cycles A, unlike the prior art. Since the duration of each prescribed cycle A is constant, the operating modes of the pumps 31, 32 are changed periodically in the illustrated embodiment. Thus, in the embodiment, the level of the noise caused by the pumps 31, 32 is prevented from varying non-periodically. This suppresses discomfort of the occupants of the vehicle.

Further, the greater the estimated retaining amount ST in the reservoirs 29, 30 is, the greater the deviation correction amount Qreq_Ave the ECU 18 sets. This allows the ECU 18 to quickly decrease the actual retaining amount STr despite of increase of such actual retaining amount STr. In other words, the ECU 18 sets the operating pattern of each pump 31, 32 in correspondence with the amount of the brake fluid flowing from the wheel cylinders 19a to 19d to the reservoirs 29, 30.

(2) The deviation correction period KT2 is set to a duration longer than the duration of the prescribed cycle A. Thus, the deviation correction amount Qreq_Ave is changed for each of the prescribed cycles A. In other words, the ECU 18 is allowed to repeatedly set the deviation correction amount Qreq_Ave for a plurality of times in the deviation pump control. This reduces the change amount of the deviation correction amount Qreq_Ave in each of the prescribed cycles A compared to, for example, the case in which the duration of the deviation correction period KT2 is set to a value smaller than the duration of each prescribed cycle A. Thus, fluctuation of the noise caused by the pumps 31, 32 is decreased. The discomfort of the occupants of the vehicle is thus further effectively suppressed.

(3) The duration of the deviation correction period KT2 is set to a value smaller than six times the duration of each prescribed cycle A. Thus, the change amount of the deviation correction amount Qreq_Ave is maintained at an appropriate level without becoming an excessively small value. In other words, the deviation correction amount Qreq_Ave and the target suction amount Qreq are set to appropriate values in correspondence with the average retaining amount STave. This facilitates suppression of increase of the actual retaining amount STr.

(4) When the ECU 18 determines that the road surface on which the vehicle travels has changed from the high μ road surface to the low μ road surface while performing the ABS control, the ECU 18 performs the emergency pump control. Specifically, the ECU 18 sets the target suction amount Qreq using the sum of the reference suction amount Qreq_base and the emergency correction amount Qreq_Skid. Thus, if the μ value of the road surface on which the vehicle travels quickly drops and thus the amount of the brake fluid flowing into the reservoirs 29, 30 rapidly increases, the actual retaining amount STr is quickly decreased in the illustrated embodiment If the ECU 18 determines that such rapid drop of the μ value of the road surface on which the vehicle travels has not occurred, the ECU 18 does not perform the emergency pump control. That is, the ECU 18 suppresses fluctuation of the degree of the noise caused by the pumps 31, 32 by preventing unnecessary shifting of the operating modes of the pumps 31, 32. This suppresses discomfort of the occupants of the vehicle. In the emergency pump control, the ECU 18 sets the operating pattern of each pump 31, 32 in correspondence with the amount of the fluid flowing from the wheel cylinders 19a to 19d to the reservoirs 29, 30.

(5) The greater the change amount of the μ value of the road surface is, the greater the emergency correction amount Qreq_Skid the ECU 18 sets. Thus, regardless of increase of the fluid flowing into the reservoirs 29, 30, the reservoirs 29, 30 are prevented from becoming full in the illustrated embodiment.

(6) The ECU 18 determines whether the μ value of the road surface on which the vehicle travels has dropped based on the estimated increase amount STskid, which varies in correspondence with the μ value of the road surface. This allows reliable detection of change of the μ value of the road surface.

(7) The ECU 18 sets the emergency correction amount Qreq_Skid by dividing the estimated increase amount STskid by the emergency correction period KT3. This allows the ECU 18 to set the emergency correction amount Qreq_Skid to a value corresponding to the estimated increase amount STskid.

(8) If the road surface on which the vehicle travels has changed from the high μ road surface to the low μ road surface and the ECU 18 is to raise the target suction amount Qreq quickly, the ECU 18 performs the deviation pump control. In contrast, if change of the μ value of the road surface is small and the ECU 18 is to suppress rapid change of the target suction amount Qreq, the ECU 18 performs the deviation pump control. That is, the ECU 18 selects an appropriate mode of pump control in correspondence with the change of the μ value of the road surface on which the vehicle travels.

(9) The ECU 18 sets the reference suction amount Qreq_base based on the vehicle deceleration DVref, which varies in correspondence with the change of the μ value of the road surface on which the vehicle travels. The ECU 18 sets the target suction amount Qreq based on the reference suction amount Qreq_base. The target suction amount Qreq is thus set to an appropriate value corresponding to the μ value.

(10) If the road surface on which the vehicle travels has changed from the high μ road surface to the low μ road surface when the deviation pump control is performed, the ECU 18 performs the deviation pump control and the emergency pump control continuously until the deviation pump control is ended. In other words, the target suction amount Qreq immediately after the road surface has changed from the high μ road surface to the low μ road surface is the sum of the reference suction amount Qreq_base, the deviation correction amount Qreq_Ave, and the emergency correction amount Qreq_Skid. This facilitates quick decrease of the actual retaining amount STr.

(11) The duration of the emergency correction period KT3 is set to a value not less than the duration of each prescribed cycle A and not more than six times the duration of the prescribed cycle A. That is, the emergency correction period KT3 is set to a value not less than 0.5 second and not more than 3 seconds. In the illustrated embodiment, the emergency correction period KT3 is set to one second, which is twice as great as the duration of each prescribed cycle A.

If the emergency correction period KT3 is less than 0.5 second, that is, if, for example, 0.2 second, the target suction amount Qreq becomes excessively high. Thus, the noise caused by the pumps 31, 32 may increase excessively. In contrast, if the emergency correction period KT3 is greater than 3 seconds, for example, 4 seconds, the target suction amount Qreq becomes excessively low. This may slow down the speed at which the actual retaining amount STr decreases.

However, in the emergency pump control of the illustrated embodiment, the actual retaining amount STr is rapidly decreased while the noise caused by the pumps 31, 32 is prevented from increasing.

(12) After completion of the ABS control, the ECU 18 sets the target suction amount Qreq through at least one of the deviation pump correction and the emergency pump correction during a period corresponding to the post-processing threshold value KTend. This reliably sucks the brake fluid that has been temporarily retained in the reservoirs 29, 30 in the ABS control to the exteriors of the reservoirs 29, 30 by the time a subsequent cycle of ABS control is resumed.

The illustrated embodiment may be modified as follows.

After the road surface on which the vehicle travels has changed from the high μ road surface to the low μ road surface during the deviation pump control, the ECU 18 does not necessarily have to perform both the deviation pump control and the emergency pump control. For example, the ECU 18 may immediately end the deviation pump control that is currently performed and thus perform the emergency pump control solely. In other words, the expression 8 of step S90 may be modified in such a manner that the target suction amount Qreq is set only by the sum of the reference suction amount Qreq_base and the emergency correction amount Qreq_Skid.

Determination whether the road surface on which the vehicle travels has shifted from the high μ road surface to the low μ road surface does not necessarily have to depend on monitoring of the estimated increase amount STskid by the ECU 18. The ECU 18 may determine whether the road surface on which the vehicle travels has changed from the high μ road surface to the low μ road surface depending on whether the change rate of the absolute value of the vehicle deceleration DVref has exceeded a threshold value.

The duration of the emergency correction period KT3 may be set to any value as long as the value is not less than the duration of each prescribed cycle A and not more than six times the duration of the prescribed cycle A. In other words, the duration of the deviation correction period KT2 may be set to any value as long as the value is not less than 0.5 second and not more than 3 seconds. That is, the deviation correction period KT2 may be set to, for example, 2 seconds.

The emergency correction amount Qreq_Skid may be a predetermined constant value. It is preferred that the emergency correction amount Qreq_Skid be constantly set to a value greater than the deviation correction amount Qreq_Ave.

The emergency correction amount Qreq_Skid may be set by multiplying the calculation result of the expression 7 by a coefficient, which is, for example, "1.2".

The duration of the deviation correction period KT2 may be set to any value as long as the value is not less than the duration of each prescribed cycle A and not more than six times the duration of the prescribed cycle A. In other words, the duration of the deviation correction period KT2 may be set to any value as long as the value is not less than 0.5 second and not more than 3 seconds. That is, the deviation correction period KT2 may be set to, for example, 1.5 seconds.

If the deviation correction amount Qreq_Ave is a negative value, the deviation correction amount Qreq_Ave does not necessarily have to be added to the reference suction amount Qreq_base.

The deviation correction amount Qreq_Ave may be set by multiplying the calculation result of the expression 4 by a predetermined coefficient, which is, for example, "1.1".

The deviation pump control does not necessarily have to be performed in the ABS control. That is, if the road surface on which the vehicle travels changes from the high μ road surface to the low μ road surface during the ABS control, the actual retaining amount STr is rapidly decreased only through the emergency pump control. In this case, the operating modes of the pumps 31, 32 are not changed as long as such switching of the road surface from the high μ road surface to the low μ road surface does not occur.

Further, the emergency pump control does not necessarily have to be performed in the ABS control. Specifically, the actual retaining amount STr is prevented from increasing solely through the deviation pump control in the ABS control. However, it is preferred that the emergency pump control be performed in the ABS control in order to rapidly decrease the actual retaining amount STr.

The invention claimed is:

1. A vehicle brake controller that controls a vehicle brake apparatus, the vehicle brake apparatus braking a wheel that moves on a road surface, the vehicle brake apparatus comprising:
   a line for brake fluid;
   a wheel cylinder arranged in the line in correspondence with the wheel, the wheel cylinder applying a braking force to the wheel in correspondence with a brake fluid pressure produced based on braking operation by the driver;
   a reservoir provided in the line, the reservoir retaining the brake fluid flowing out from the wheel cylinder, a direction heading from the wheel cylinder to the reservoir being referred to as a flow direction of the brake fluid;
   a pump that sucks the brake fluid retained in the reservoir, the pump discharging the sucked brake fluid to a portion of the line that is upstream from the wheel cylinder with respect to the flow direction; and
   an on-off valve arranged in the line at a position between the wheel cylinder and the reservoir,
   wherein the brake controller controls the pump and the on-off valve in such a manner as to repeat a cycle of increase and decrease of a retaining amount of the brake fluid in the reservoir,
   wherein the brake controller includes:
   a reference suction amount setting section that sets a reference suction amount of the pump, wherein the greater a μ value of the road surface is, the greater the reference suction amount the reference suction amount setting section sets;
   an average retaining amount estimating section that estimates an average retaining amount, which is a time average of the retaining amount, wherein, each time a prescribed cycle ends, the average retaining amount estimating section estimates the average retaining amount in the current prescribed cycle on the assumption that the pump has sucked a constant amount of brake fluid in the current prescribed cycle;
   a deviation correction amount setting section that sets a deviation correction amount in accordance with which a deviation of the average retaining amount is corrected, the deviation correction amount setting section calculating the deviation between the average retaining amount at the end of the previous prescribed cycle and the average retaining amount at the end of the current prescribed cycle, wherein the greater the deviation is, the greater the deviation correction amount the deviation correction amount setting section sets; and
   a control section that performs a deviation pump control on the pump, wherein, while performing the deviation pump control, the control section sets a target suction amount of the pump based on the reference suction amount and the deviation correction amount, and controls the pump in such a manner that the pump sucks the brake fluid by the amount corresponding to the target suction amount.

2. The vehicle brake controller according to claim 1, wherein the deviation correction amount setting section sets the deviation correction amount by dividing, by a deviation correction period, the deviation between the average retaining amount at the end of the previous prescribed cycle and the average retaining amount at the end of the current prescribed cycle, the deviation correction period being set to a duration not less than the duration of the prescribed cycle, and
   wherein the control section performs the deviation pump control as long as the deviation correction period lasts after the current prescribed cycle ends.

3. The vehicle brake controller according to claim 2, wherein the deviation correction period is set to a value smaller than six times the duration of the prescribed cycle.

4. The vehicle brake controller according to claim 3, wherein the control section further determines whether the μ value has become smaller, wherein, when determining that the μ value has not become smaller, the control section performs the deviation pump control on the pump, and when determining that the μ value has become smaller, the control section performs an emergency pump control on the pump, and
   wherein, while performing the emergency pump control, the control section sets an emergency correction amount in accordance with which the suction amount of the brake fluid by the pump is corrected, the control section setting the target suction amount based on the reference suction amount and the emergency correction amount.

5. The vehicle brake controller according to claim 4, further comprising a vehicle deceleration calculating section that calculates a vehicle deceleration, wherein the reference suction amount setting section estimates the μ value based on the absolute value of the vehicle deceleration.

6. The vehicle brake controller according to claim 1, wherein the control section further determines whether the μ value has become smaller, wherein, when determining that the μ value has not become smaller, the control section performs the deviation pump control on the pump, and when determining that the μ value has become smaller, the control section performs an emergency pump control on the pump, and wherein, while performing the emergency pump control, the control section sets an emergency correction amount in accordance with which the suction amount of the brake fluid by the pump is corrected, the control section setting the target suction amount based on the reference suction amount and the emergency correction amount.

7. The vehicle brake controller according to claim 6, further comprising a vehicle deceleration calculating section that calculates a vehicle deceleration, wherein the reference suction amount setting section estimates the μ value based on an absolute value of the vehicle deceleration.

8. A vehicle brake controller that controls a vehicle brake apparatus, the vehicle brake apparatus braking a wheel that moves on a road surface, the vehicle brake apparatus comprising:

a line for a brake fluid;

a wheel cylinder arranged in the line in correspondence with the wheel, the wheel cylinder applying a braking force to the wheel in correspondence with a brake fluid pressure produced based on braking operation by the driver;

a reservoir provided in the line, the reservoir retaining the brake fluid flowing out from the wheel cylinder, a direction heading from the wheel cylinder to the reservoir being referred to as a flow direction of the brake fluid;

a pump that sucks the brake fluid retained in the reservoir, the pump discharging the sucked brake fluid to a portion of the line that is upstream from the wheel cylinder with respect to the flow direction; and an on-off valve arranged in the line at a position between the wheel cylinder and the reservoir, wherein the brake controller controls the pump and the on-off valve in such a manner as to repeat a cycle of increase and decrease of a retaining amount of the brake fluid in the reservoir, wherein the brake controller includes:

a reference suction amount setting section that sets a reference suction amount of the pump, wherein the greater a μ value of the road surface is, the greater the reference suction amount the reference suction amount setting section sets; and a control section that determines whether the μ value has become smaller, wherein, when determining that the μ value has become smaller, the control section performs an emergency pump control on the pump, the control section setting an emergency correction amount, in accordance with which the suction amount of the pump is corrected, while performing the emergency pump control, the control section setting a target suction amount of the pump based on the reference suction amount and the emergency correction amount and controlling the pump in such a manner that the pump sucks the brake fluid by the amount corresponding to the target suction amount, the control section comprising an emergency correction amount setting section, wherein, if it is determined that the μ value has become smaller, the greater the change amount of the μ value is, the greater the emergency correction amount the emergency correction amount setting section sets, and wherein, while performing the emergency pump control, the control section sets the target suction amount based on the sum of the reference suction amount and the emergency correction amount, wherein the emergency correction amount setting section calculates an increase amount of the retaining amount of the brake fluid in the reservoir from when the retaining amount starts to increase to when such increase of the retaining amount ends, the emergency correction amount setting section determining whether the increase amount is greater than or equal to a μ threshold value, the μ threshold value being a predetermined value, and wherein, if the increase amount is greater than or equal to the μ threshold value, the emergency correction amount setting section determines that the μ value has become smaller.

9. The vehicle brake controller according to claim 8, wherein the emergency correction amount setting section sets the emergency correction amount by dividing the increase amount by an emergency correction period, the emergency correction period being a predetermined period, and wherein the control section performs the emergency pump control as long as the emergency correction period lasts after the control section determines that the μ value has become smaller.

10. The vehicle brake controller according to claim 8, wherein the control section further includes:

an average retaining amount estimating section that estimates an average retaining amount, which is a time average of the retaining amount, wherein, each time a prescribed cycle ends, the average retaining amount estimating section estimates the average retaining amount in the current prescribed cycle on the assumption that the pump has sucked a constant amount of brake fluid in the current prescribed cycle; and a deviation correction amount setting section that sets a deviation correction amount in accordance with which a deviation of the average retaining amount is corrected, the deviation correction amount setting section calculating the deviation between the average retaining amount at the end of the previous prescribed cycle and the average retaining amount at the end of the current prescribed cycle, the greater the deviation becomes, the greater the deviation correction amount the deviation correction amount setting section sets, wherein the control section determines whether the μ value has become smaller, wherein, when determining that the μ value has not become smaller, the control section performs a deviation pump control on the pump, and when determining that μ value has become smaller, the control section performs the emergency pump control on the pump, and wherein, while performing the deviation pump control, the control section sets a target suction amount of the pump based on the reference suction amount and the deviation correction amount and controls the pump in such a manner that the pump sucks the brake fluid by the amount corresponding to the target suction amount.

11. The vehicle brake controller according to claim 10, further comprising a vehicle deceleration calculating section that calculates a vehicle deceleration, wherein the reference suction amount setting section estimates the μ value based on the absolute value of the vehicle deceleration.

12. A vehicle brake controller that controls a vehicle brake apparatus, the vehicle brake apparatus braking a wheel that moves on a road surface, the vehicle brake apparatus comprising:
   a line for a brake fluid;
   a wheel cylinder arranged in the line in correspondence with the wheel, the wheel cylinder applying a braking force to the wheel in correspondence with a brake fluid pressure produced based on braking operation by the driver;
   a reservoir provided in the line, the reservoir retaining the brake fluid flowing out from the wheel cylinder, a direction heading from the wheel cylinder to the reservoir being referred to as a flow direction of the brake fluid;
   a pump that sucks the brake fluid retained in the reservoir, the pump discharging the sucked brake fluid to a portion of the line that is upstream from the wheel cylinder with respect to the flow direction; and
   an on-off valve arranged in the line at a position between the wheel cylinder and the reservoir,
   wherein the brake controller controls the pump and the on-off valve in such a manner as to repeat a cycle of increase and decrease of a retaining amount of the brake fluid in the reservoir,
   wherein the brake controller includes:
   a reference suction amount setting section that sets a reference suction amount of the pump, wherein the greater a μ value of the road surface is, the greater the reference suction amount the reference suction amount setting section sets; and
   a control section that determines whether the μ value has become smaller, wherein, when determining that the μ value has become smaller, the control section performs an emergency pump control on the pump, the control section setting an emergency correction amount, in accordance with which the suction amount of the pump is corrected, while performing the emergency pump control, the control section setting a target suction amount of the pump based on the reference suction amount and the emergency correction amount and controlling the pump in such a manner that the pump sucks the brake fluid by the amount corresponding to the target suction amount,
   the control section comprising an emergency correction amount setting section, wherein, if it is determined that the μ value has become smaller, the greater the change amount of the μ value is, the greater the emergency correction amount the emergency correction amount setting section sets, and
   wherein, while performing the emergency pump control, the control section sets the target suction amount based on the sum of the reference suction amount and the emergency correction amount,
   wherein the emergency correction amount setting section calculates an increase amount of the retaining amount of the brake fluid in the reservoir from when the retaining amount starts to increase to when such increase of the retaining amount ends, the emergency correction amount setting section setting the emergency correction amount by dividing the increase amount by an emergency correction period, the emergency correction period being a predetermined period, and
   wherein the control section performs the emergency pump control as long as the emergency correction period lasts after it is determined that the μ value has become smaller.

13. The vehicle brake controller according to claim 12, further comprising a vehicle deceleration calculating section that calculates a vehicle deceleration,
   wherein the reference suction amount setting section estimates the μ value based on the absolute value of the vehicle deceleration.

14. A vehicle brake controller that controls a vehicle brake apparatus, the vehicle brake apparatus braking a wheel that moves on a road surface, the vehicle brake apparatus comprising:
   a line for a brake fluid;
   a wheel cylinder arranged in the line in correspondence with the wheel, the wheel cylinder applying a braking force to the wheel in correspondence with a brake fluid pressure produced based on braking operation by the driver;
   a reservoir provided in the line, the reservoir retaining the brake fluid flowing out from the wheel cylinder, a direction heading from the wheel cylinder to the reservoir being referred to as a flow direction of the brake fluid;
   a pump that sucks the brake fluid retained in the reservoir, the pump discharging the sucked brake fluid to a portion of the line that is upstream from the wheel cylinder with respect to the flow direction; and
   an on-off valve arranged in the line at a position between the wheel cylinder and the reservoir,
   wherein the brake controller controls the pump and the on-off valve in such a manner as to repeat a cycle of increase and decrease of a retaining amount of the brake fluid in the reservoir,
   wherein the brake controller includes:
   a reference suction amount setting section that sets a reference suction amount of the pump, wherein the greater a μ value of the road surface is, the greater the reference suction amount the reference suction amount setting section sets; and
   a control section that determines whether the μ value has become smaller, wherein, when determining that the μ value has become smaller, the control section performs an emergency pump control on the pump, the control section setting an emergency correction amount, in accordance with which the suction amount of the pump is corrected, while performing the emergency pump control, the control section setting a target suction amount of the pump based on the reference suction amount and the emergency correction amount and controlling the pump in such a manner that the pump sucks the brake fluid by the amount corresponding to the target suction amount,
   wherein the control section further includes:
   an average retaining amount estimating section that estimates an average retaining amount, which is a time average of the retaining amount, wherein, each time a prescribed cycle ends, the average retaining amount estimating section estimates the average retaining amount in the current prescribed cycle on the assumption that the pump has sucked a constant amount of brake fluid in the current prescribed cycle; and
   a deviation correction amount setting section that sets a deviation correction amount in accordance with which a deviation of the average retaining amount is corrected, the deviation correction amount setting section calculating the deviation between the average retaining amount at the end of the previous prescribed cycle and the average retaining amount at the end of the current prescribed cycle, wherein the greater the deviation is, the greater the deviation correction amount the deviation correction amount setting section sets, wherein the control section determines whether the μ value has become smaller, wherein, when determining that the μ value has not become smaller, the control section performs a deviation pump control on the pump, and when determining that the μ value has become smaller, the control section performs the emergency pump control on the pump, and wherein, while performing the deviation pump control, the control section sets a target suction amount of the pump based on the reference suction amount and the deviation correction amount and controls the pump in such a manner that the pump sucks the brake fluid by the amount corresponding to the target suction amount.

15. The vehicle brake controller according to claim 14, further comprising a vehicle deceleration calculating section that calculates a vehicle deceleration, wherein the reference suction amount setting section estimates the μ value based on the absolute value of the vehicle deceleration.

16. A vehicle brake control method that controls a vehicle brake apparatus, the vehicle brake apparatus braking a wheel that moves on a road surface, the vehicle brake apparatus comprising:

a line for brake fluid;

a wheel cylinder arranged in the line in correspondence with the wheel, the wheel cylinder applying a braking force to the wheel in correspondence with a brake fluid pressure produced based on braking operation by the driver;

a reservoir provided in the line, the reservoir retaining the brake fluid flowing out from the wheel cylinder, a direction heading from the wheel cylinder to the reservoir being referred to as a flow direction of the brake fluid;

a pump that sucks the brake fluid retained in the reservoir, the pump discharging the sucked brake fluid to a portion of the line that is upstream from the wheel cylinder with respect to the flow direction; and an on-off valve arranged in the line at a position between the wheel cylinder and the reservoir, wherein the control method controls the pump and the on-off valve in such a manner as to repeat a cycle of increase and decrease of a retaining amount of the brake fluid in the reservoir, wherein the control method includes:

setting a reference suction amount of the pump, wherein the greater a μ value of the road surface is, the greater the reference suction amount is set;

estimating an average retaining amount, which is a time average of the retaining amount, wherein, each time a prescribed cycle ends, the average retaining amount in the current prescribed cycle is estimated on the assumption that the pump has sucked a constant amount of brake fluid in the current prescribed cycle;

setting a deviation correction amount in accordance with which a deviation of the average retaining amount is corrected, the deviation between the average retaining amount at the end of the previous prescribed cycle and the average retaining amount at the end of the current prescribed cycle is calculated, wherein the greater the deviation is, the greater the deviation correction amount is set; and performing a deviation pump control on the pump, wherein performing the deviation pump control includes:

setting a target suction amount of the pump based on the reference suction amount and the deviation correction amount, and controlling the pump in such a manner that the pump sucks the brake fluid by the amount corresponding to the target suction amount.

* * * * *